US012775254B2

(12) United States Patent
Raina et al.

(10) Patent No.: US 12,775,254 B2
(45) Date of Patent: Oct. 27, 2026

(54) BUILDING SYSTEM WITH INVOLVEMENT FEATURES

(71) Applicant: Tyco Fire & Security GmbH, Neuhausen am Rheinfall (CH)

(72) Inventors: Suvidha Raina, Gurgaon (IN); Dominick J. O'Dierno, Mt Pleasant, WI (US); Dilip Divila, Khammam (IN); Yogesh Sudhakarrao Titarmare, Pune (IN); Vijay Patil, Pune (IN); Braja Majumdar, Pune (IN); Sunil Suhas Petwe, Pune (IN); Ambuj Shatdal, Madison, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 827 days.

(21) Appl. No.: 18/101,044

(22) Filed: Jan. 24, 2023

(65) Prior Publication Data

US 2023/0161306 A1 May 25, 2023

Related U.S. Application Data

(63) Continuation-in-part of application No. 16/688,440, filed on Nov. 19, 2019, now abandoned.

(30) Foreign Application Priority Data

Jan. 25, 2022 (IN) ............................ 202221004267

(51) Int. Cl.
*G05B 15/02* (2006.01)

(52) U.S. Cl.
CPC .................................. *G05B 15/02* (2013.01)

(58) Field of Classification Search
None
See application file for complete search history.

(56) References Cited

U.S. PATENT DOCUMENTS 5,301,109 A 4/1994 Landauer et al.
5,446,677 A 8/1995 Jensen et al.
(Continued)

FOREIGN PATENT DOCUMENTS

AU 2019226217 A1 11/2020
AU 2019226264 A1 11/2020
(Continued)

OTHER PUBLICATIONS

Balaji et al, "Brick: Metadata schema for portable smart building applications," Applied Energy, 2018 (20 pages).
(Continued)

*Primary Examiner* — Umut Onat
(74) *Attorney, Agent, or Firm* — Foley & Lardner LLP

(57) ABSTRACT

A building system is configured to acquire a selection of a first object representing a component of a building subsystem, acquire information regarding a second object associated with the first object where the information includes an involvement type for a relationship between the first object and the second object, and generate an involvement map for display via a graphical user interface. The involvement map includes a first indicia representing the first object and a second indicia representing the second object. The first indicia and the second indicia are connected via a connector line. The connector line includes the involvement type disposed therealong. The involvement type indicates whether the relationship between the first object represented by the first indicia and the second object represented by the second indicia is a referential involvement, a command involvement, or an unbound involvement.

18 Claims, 19 Drawing Sheets

(56) References Cited

U.S. PATENT DOCUMENTS

| | | | |
|---|---|---|---|
| 5,581,478 | A | 12/1996 | Cruse et al. |
| 5,812,962 | A | 9/1998 | Kovac |
| 5,960,381 | A | 9/1999 | Singers et al. |
| 5,973,662 | A | 10/1999 | Singers et al. |
| 6,014,612 | A | 1/2000 | Larson et al. |
| 6,031,547 | A | 2/2000 | Kennedy |
| 6,134,511 | A | 10/2000 | Subbarao |
| 6,157,943 | A | 12/2000 | Meyer |
| 6,285,966 | B1 | 9/2001 | Brown et al. |
| 6,363,422 | B1 | 3/2002 | Hunter et al. |
| 6,385,510 | B1 | 5/2002 | Hoog et al. |
| 6,389,331 | B1 | 5/2002 | Jensen et al. |
| 6,401,027 | B1 | 6/2002 | Xu et al. |
| 6,437,691 | B1 | 8/2002 | Sandelman et al. |
| 6,477,518 | B1 | 11/2002 | Li et al. |
| 6,487,457 | B1 | 11/2002 | Hull et al. |
| 6,493,755 | B1 | 12/2002 | Hansen et al. |
| 6,577,323 | B1 | 6/2003 | Jamieson et al. |
| 6,626,366 | B2 | 9/2003 | Kayahara et al. |
| 6,646,660 | B1 | 11/2003 | Patty |
| 6,704,016 | B1 | 3/2004 | Oliver et al. |
| 6,732,540 | B2 | 5/2004 | Sugihara et al. |
| 6,764,019 | B1 | 7/2004 | Kayahara et al. |
| 6,782,385 | B2 | 8/2004 | Natsumeda et al. |
| 6,813,532 | B2 | 11/2004 | Eryurek et al. |
| 6,816,811 | B2 | 11/2004 | Seem |
| 6,823,680 | B2 | 11/2004 | Jayanth |
| 6,826,454 | B2 | 11/2004 | Sulfstede |
| 6,865,511 | B2 | 3/2005 | Frerichs et al. |
| 6,925,338 | B2 | 8/2005 | Eryurek et al. |
| 6,986,138 | B1 | 1/2006 | Sakaguchi et al. |
| 7,031,880 | B1 | 4/2006 | Seem et al. |
| 7,401,057 | B2 | 7/2008 | Eder |
| 7,552,467 | B2 | 6/2009 | Lindsay |
| 7,627,544 | B2 | 12/2009 | Chkodrov et al. |
| 7,818,249 | B2 | 10/2010 | Lovejoy et al. |
| 7,889,051 | B1 | 2/2011 | Billig et al. |
| 7,996,488 | B1 | 8/2011 | Casabella et al. |
| 8,078,330 | B2 | 12/2011 | Brickfield et al. |
| 8,104,044 | B1 | 1/2012 | Scofield et al. |
| 8,155,767 | B2 | 4/2012 | Elmankabady et al. |
| 8,229,470 | B1 | 7/2012 | Ranjan et al. |
| 8,401,991 | B2 | 3/2013 | Wu et al. |
| 8,495,745 | B1 | 7/2013 | Schrecker et al. |
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | Mackay |
| 8,682,921 | B2 | 3/2014 | Park et al. |
| 8,694,905 | B2 | 4/2014 | Boykin et al. |
| 8,731,724 | B2 | 5/2014 | Drees et al. |
| 8,737,334 | B2 | 5/2014 | Ahn et al. |
| 8,738,334 | B2 | 5/2014 | Jiang et al. |
| 8,751,487 | B2 | 6/2014 | Byrne et al. |
| 8,788,097 | B2 | 7/2014 | Drees et al. |
| 8,805,995 | B1 | 8/2014 | Oliver |
| 8,843,238 | B2 | 9/2014 | Wenzel et al. |
| 8,874,071 | B2 | 10/2014 | Sherman et al. |
| 8,941,465 | B2 | 1/2015 | Pineau et al. |
| 8,990,127 | B2 | 3/2015 | Taylor |
| 9,070,113 | B2 | 6/2015 | Shafiee et al. |
| 9,116,978 | B2 | 8/2015 | Park et al. |
| 9,185,095 | B1 | 11/2015 | Moritz et al. |
| 9,189,527 | B2 | 11/2015 | Park et al. |
| 9,196,009 | B2 | 11/2015 | Drees et al. |
| 9,229,966 | B2 | 1/2016 | Aymeloglu et al. |
| 9,286,582 | B2 | 3/2016 | Drees et al. |
| 9,311,807 | B2 | 4/2016 | Schultz et al. |
| 9,344,751 | B1 | 5/2016 | Ream et al. |
| 9,354,968 | B2 | 5/2016 | Wenzel et al. |
| 9,507,686 | B2 | 11/2016 | Horn et al. |
| 9,524,594 | B2 | 12/2016 | Ouyang et al. |
| 9,558,196 | B2 | 1/2017 | Johnston et al. |
| 9,652,813 | B2 | 5/2017 | Gifford et al. |
| 9,753,455 | B2 | 9/2017 | Drees |
| 9,811,249 | B2 | 11/2017 | Chen et al. |
| 9,838,844 | B2 | 12/2017 | Emeis et al. |
| 9,886,478 | B2 | 2/2018 | Mukherjee |
| 9,948,359 | B2 | 4/2018 | Horton |
| 10,055,114 | B2 | 8/2018 | Shah et al. |
| 10,055,206 | B2 | 8/2018 | Park et al. |
| 10,116,461 | B2 | 10/2018 | Fairweather et al. |
| 10,169,454 | B2 | 1/2019 | Ait-Mokhtar et al. |
| 10,171,297 | B2 | 1/2019 | Stewart et al. |
| 10,171,586 | B2 | 1/2019 | Shaashua et al. |
| 10,187,258 | B2 | 1/2019 | Nagesh et al. |
| 10,341,132 | B2 | 7/2019 | Schubert et al. |
| 10,345,772 | B2 | 7/2019 | Piaskowski et al. |
| 10,514,963 | B2 | 12/2019 | Shrivastava et al. |
| 10,515,098 | B2 | 12/2019 | Park et al. |
| 10,534,326 | B2 | 1/2020 | Sridharan et al. |
| 10,536,295 | B2 | 1/2020 | Fairweather et al. |
| 10,544,955 | B2 | 1/2020 | Przybylski |
| 10,564,993 | B2 | 2/2020 | Deutsch et al. |
| 10,612,805 | B2 | 4/2020 | Przybylski |
| 10,648,688 | B2 | 5/2020 | Przybylski et al. |
| 10,705,492 | B2 | 7/2020 | Harvey |
| 10,708,078 | B2 | 7/2020 | Harvey |
| 10,746,428 | B2 | 8/2020 | Przybylski et al. |
| 10,760,815 | B2 | 9/2020 | Janakiraman et al. |
| 10,762,475 | B2 | 9/2020 | Song et al. |
| 10,767,885 | B2 | 9/2020 | Przybylski et al. |
| 10,782,984 | B2 | 9/2020 | Schwartz et al. |
| 10,785,049 | B2 | 9/2020 | Brun et al. |
| 10,824,120 | B2 | 11/2020 | Ahmed |
| 10,845,771 | B2 | 11/2020 | Harvey |
| 10,854,194 | B2 | 12/2020 | Park et al. |
| 10,862,928 | B1 | 12/2020 | Badawy et al. |
| 10,921,760 | B2 | 2/2021 | Harvey |
| 10,921,972 | B2 | 2/2021 | Park et al. |
| 10,969,133 | B2 | 4/2021 | Harvey |
| 10,976,068 | B2 | 4/2021 | Hallendy et al. |
| 10,986,121 | B2 | 4/2021 | Stockdale et al. |
| 11,016,998 | B2 | 5/2021 | Park et al. |
| 11,024,292 | B2 | 6/2021 | Park et al. |
| 11,038,709 | B2 | 6/2021 | Park et al. |
| 11,041,650 | B2 | 6/2021 | Li et al. |
| 11,054,796 | B2 | 7/2021 | Holaso |
| 11,070,390 | B2 | 7/2021 | Park et al. |
| 11,073,976 | B2 | 7/2021 | Park et al. |
| 11,108,587 | B2 | 8/2021 | Park et al. |
| 11,113,295 | B2 | 9/2021 | Park et al. |
| 11,229,138 | B1 | 1/2022 | Harvey et al. |
| 11,314,726 | B2 | 4/2022 | Park et al. |
| 11,314,788 | B2 | 4/2022 | Park et al. |
| 11,556,105 | B2 | 1/2023 | Cooley et al. |
| 11,561,522 | B2 | 1/2023 | Cooley et al. |
| 11,561,523 | B2 | 1/2023 | Cooley et al. |
| 11,573,551 | B2 | 2/2023 | Cooley et al. |
| 11,586,167 | B2 | 2/2023 | Cooley et al. |
| 2002/0010562 | A1 | 1/2002 | Schleiss et al. |
| 2002/0016639 | A1 | 2/2002 | Smith et al. |
| 2002/0059229 | A1 | 5/2002 | Natsumeda et al. |
| 2002/0123864 | A1 | 9/2002 | Eryurek et al. |
| 2002/0147506 | A1 | 10/2002 | Eryurek et al. |
| 2002/0177909 | A1 | 11/2002 | Fu et al. |
| 2003/0005486 | A1 | 1/2003 | Ridolfo et al. |
| 2003/0014130 | A1 | 1/2003 | Grumelart |
| 2003/0073432 | A1 | 4/2003 | Meade, II |
| 2003/0158704 | A1 | 8/2003 | Triginai et al. |
| 2003/0171851 | A1 | 9/2003 | Brickfield et al. |
| 2003/0200059 | A1 | 10/2003 | Ignatowski et al. |
| 2004/0068390 | A1 | 4/2004 | Saunders |
| 2004/0128314 | A1 | 7/2004 | Katibah et al. |
| 2004/0133314 | A1 | 7/2004 | Ehlers et al. |
| 2004/0199360 | A1 | 10/2004 | Friman et al. |
| 2005/0055308 | A1 | 3/2005 | Meyer et al. |
| 2005/0108262 | A1 | 5/2005 | Fawcett et al. |
| 2005/0154494 | A1 | 7/2005 | Ahmed |
| 2005/0278703 | A1 | 12/2005 | Lo et al. |
| 2005/0283337 | A1 | 12/2005 | Sayal |
| 2006/0095521 | A1 | 5/2006 | Patinkin |
| 2006/0140207 | A1 | 6/2006 | Eschbach et al. |

(56) References Cited

U.S. PATENT DOCUMENTS

| | | | |
|---|---|---|---|
| 2006/0184479 | A1 | 8/2006 | Levine |
| 2006/0200476 | A1 | 9/2006 | Gottumukkala et al. |
| 2006/0236254 | A1 | 10/2006 | Mateescu et al. |
| 2006/0265751 | A1 | 11/2006 | Cosquer et al. |
| 2006/0271589 | A1 | 11/2006 | Horowitz et al. |
| 2007/0028179 | A1 | 2/2007 | Levin et al. |
| 2007/0203693 | A1 | 8/2007 | Estes |
| 2007/0261062 | A1 | 11/2007 | Bansal et al. |
| 2007/0273497 | A1 | 11/2007 | Kuroda et al. |
| 2007/0273610 | A1 | 11/2007 | Baillot |
| 2008/0034425 | A1 | 2/2008 | Overcash et al. |
| 2008/0094230 | A1 | 4/2008 | Mock et al. |
| 2008/0097816 | A1 | 4/2008 | Freire et al. |
| 2008/0186160 | A1 | 8/2008 | Kim et al. |
| 2008/0249756 | A1 | 10/2008 | Chaisuparasmikul |
| 2008/0252723 | A1 | 10/2008 | Park |
| 2008/0281472 | A1 | 11/2008 | Podgorny et al. |
| 2009/0195349 | A1 | 8/2009 | Frader-Thompson et al. |
| 2010/0045439 | A1 | 2/2010 | Tak et al. |
| 2010/0058248 | A1 | 3/2010 | Park |
| 2010/0131533 | A1 | 5/2010 | Ortiz |
| 2010/0274366 | A1 | 10/2010 | Fata et al. |
| 2010/0281387 | A1 | 11/2010 | Holland et al. |
| 2010/0286937 | A1 | 11/2010 | Hedley et al. |
| 2010/0324962 | A1 | 12/2010 | Nesler et al. |
| 2011/0015802 | A1 | 1/2011 | Imes |
| 2011/0047418 | A1 | 2/2011 | Drees et al. |
| 2011/0061015 | A1 | 3/2011 | Drees et al. |
| 2011/0071685 | A1 | 3/2011 | Huneycutt et al. |
| 2011/0077950 | A1 | 3/2011 | Hughston |
| 2011/0087650 | A1 | 4/2011 | Mackay et al. |
| 2011/0087988 | A1 | 4/2011 | Ray et al. |
| 2011/0088000 | A1 | 4/2011 | Mackay |
| 2011/0125737 | A1 | 5/2011 | Pothering et al. |
| 2011/0137853 | A1 | 6/2011 | Mackay |
| 2011/0153603 | A1 | 6/2011 | Adiba et al. |
| 2011/0154363 | A1 | 6/2011 | Karmarkar |
| 2011/0157357 | A1 | 6/2011 | Weisensale et al. |
| 2011/0178977 | A1 | 7/2011 | Drees |
| 2011/0191343 | A1 | 8/2011 | Heaton et al. |
| 2011/0205022 | A1 | 8/2011 | Cavallaro et al. |
| 2011/0218777 | A1 | 9/2011 | Chen et al. |
| 2012/0011126 | A1 | 1/2012 | Park et al. |
| 2012/0011141 | A1 | 1/2012 | Park et al. |
| 2012/0022698 | A1 | 1/2012 | Mackay |
| 2012/0062577 | A1 | 3/2012 | Nixon |
| 2012/0064923 | A1 | 3/2012 | Imes et al. |
| 2012/0083930 | A1 | 4/2012 | Ilic et al. |
| 2012/0100825 | A1 | 4/2012 | Sherman et al. |
| 2012/0101637 | A1 | 4/2012 | Imes et al. |
| 2012/0135759 | A1 | 5/2012 | Imes et al. |
| 2012/0136485 | A1 | 5/2012 | Weber et al. |
| 2012/0158633 | A1 | 6/2012 | Eder |
| 2012/0259583 | A1 | 10/2012 | Noboa et al. |
| 2012/0272228 | A1 | 10/2012 | Marndi et al. |
| 2012/0278051 | A1 | 11/2012 | Jiang et al. |
| 2013/0007063 | A1 | 1/2013 | Kalra et al. |
| 2013/0038430 | A1 | 2/2013 | Blower et al. |
| 2013/0038707 | A1 | 2/2013 | Cunningham et al. |
| 2013/0060820 | A1 | 3/2013 | Bulusu et al. |
| 2013/0085610 | A1 | 4/2013 | Brun et al. |
| 2013/0086497 | A1 | 4/2013 | Ambuhl et al. |
| 2013/0097706 | A1 | 4/2013 | Titonis et al. |
| 2013/0103221 | A1 | 4/2013 | Raman et al. |
| 2013/0167035 | A1 | 6/2013 | Imes et al. |
| 2013/0170710 | A1 | 7/2013 | Kuoch et al. |
| 2013/0204836 | A1 | 8/2013 | Choi et al. |
| 2013/0246916 | A1 | 9/2013 | Reimann et al. |
| 2013/0247205 | A1 | 9/2013 | Schrecker et al. |
| 2013/0262035 | A1 | 10/2013 | Mills |
| 2013/0275174 | A1 | 10/2013 | Bennett et al. |
| 2013/0275908 | A1 | 10/2013 | Reichard |
| 2013/0297050 | A1 | 11/2013 | Reichard et al. |
| 2013/0298244 | A1 | 11/2013 | Kumar et al. |
| 2013/0331995 | A1 | 12/2013 | Rosen |
| 2013/0338970 | A1 | 12/2013 | Reghetti |
| 2014/0032506 | A1 | 1/2014 | Hoey et al. |
| 2014/0059483 | A1 | 2/2014 | Mairs et al. |
| 2014/0081652 | A1 | 3/2014 | Klindworth |
| 2014/0135952 | A1 | 5/2014 | Maehara |
| 2014/0152651 | A1 | 6/2014 | Chen et al. |
| 2014/0172184 | A1 | 6/2014 | Schmidt et al. |
| 2014/0189861 | A1 | 7/2014 | Gupta et al. |
| 2014/0207282 | A1 | 7/2014 | Angle et al. |
| 2014/0258052 | A1 | 9/2014 | Khuti et al. |
| 2014/0269614 | A1 | 9/2014 | Maguire et al. |
| 2014/0277765 | A1 | 9/2014 | Karimi et al. |
| 2014/0278461 | A1 | 9/2014 | Artz |
| 2014/0327555 | A1 | 11/2014 | Sager et al. |
| 2014/0365980 | A1* | 12/2014 | Morrison .............. G06F 3/0485 715/863 |
| 2015/0019174 | A1 | 1/2015 | Kiff et al. |
| 2015/0042240 | A1 | 2/2015 | Aggarwal et al. |
| 2015/0105917 | A1 | 4/2015 | Sasaki et al. |
| 2015/0113462 | A1 | 4/2015 | Chen et al. |
| 2015/0145468 | A1 | 5/2015 | Ma et al. |
| 2015/0156031 | A1 | 6/2015 | Fadell et al. |
| 2015/0168931 | A1 | 6/2015 | Jin |
| 2015/0172300 | A1 | 6/2015 | Cochenour |
| 2015/0178421 | A1 | 6/2015 | Borrelli et al. |
| 2015/0185261 | A1 | 7/2015 | Frader-Thompson et al. |
| 2015/0186777 | A1 | 7/2015 | Lecue et al. |
| 2015/0202962 | A1 | 7/2015 | Habashima et al. |
| 2015/0204563 | A1 | 7/2015 | Imes et al. |
| 2015/0235267 | A1 | 8/2015 | Steube et al. |
| 2015/0241895 | A1 | 8/2015 | Lu et al. |
| 2015/0244730 | A1 | 8/2015 | Vu et al. |
| 2015/0244732 | A1 | 8/2015 | Golshan et al. |
| 2015/0261863 | A1 | 9/2015 | Dey et al. |
| 2015/0263900 | A1 | 9/2015 | Polyakov et al. |
| 2015/0286969 | A1 | 10/2015 | Warner et al. |
| 2015/0295796 | A1 | 10/2015 | Hsiao et al. |
| 2015/0304193 | A1 | 10/2015 | Ishii et al. |
| 2015/0316918 | A1 | 11/2015 | Schleiss et al. |
| 2015/0324422 | A1 | 11/2015 | Elder |
| 2015/0341212 | A1 | 11/2015 | Hsiao et al. |
| 2015/0348417 | A1 | 12/2015 | Ignaczak et al. |
| 2015/0379080 | A1 | 12/2015 | Jochimski |
| 2016/0011753 | A1 | 1/2016 | Mcfarland et al. |
| 2016/0033946 | A1 | 2/2016 | Zhu et al. |
| 2016/0035246 | A1 | 2/2016 | Curtis |
| 2016/0065601 | A1 | 3/2016 | Gong et al. |
| 2016/0070736 | A1 | 3/2016 | Swan et al. |
| 2016/0078229 | A1 | 3/2016 | Gong et al. |
| 2016/0090839 | A1 | 3/2016 | Stolarczyk |
| 2016/0118790 | A1 | 4/2016 | Imhof et al. |
| 2016/0119434 | A1 | 4/2016 | Dong et al. |
| 2016/0127712 | A1 | 5/2016 | Alfredsson et al. |
| 2016/0139752 | A1 | 5/2016 | Shim et al. |
| 2016/0163186 | A1 | 6/2016 | Davidson et al. |
| 2016/0170390 | A1 | 6/2016 | Xie et al. |
| 2016/0171862 | A1 | 6/2016 | Das et al. |
| 2016/0173816 | A1 | 6/2016 | Huenerfauth et al. |
| 2016/0179315 | A1 | 6/2016 | Sarao et al. |
| 2016/0179342 | A1 | 6/2016 | Sarao et al. |
| 2016/0179990 | A1 | 6/2016 | Sarao et al. |
| 2016/0195856 | A1 | 7/2016 | Spero |
| 2016/0212165 | A1 | 7/2016 | Singla et al. |
| 2016/0239660 | A1 | 8/2016 | Azvine et al. |
| 2016/0239756 | A1 | 8/2016 | Aggour et al. |
| 2016/0247129 | A1 | 8/2016 | Song et al. |
| 2016/0260063 | A1 | 9/2016 | Harris et al. |
| 2016/0313751 | A1 | 10/2016 | Risbeck et al. |
| 2016/0313752 | A1 | 10/2016 | Przybylski |
| 2016/0313902 | A1 | 10/2016 | Hill et al. |
| 2016/0350364 | A1 | 12/2016 | Anicic et al. |
| 2016/0357521 | A1 | 12/2016 | Zhang et al. |
| 2016/0357828 | A1 | 12/2016 | Tobin et al. |
| 2016/0358432 | A1 | 12/2016 | Branscomb et al. |
| 2016/0363336 | A1 | 12/2016 | Roth et al. |
| 2016/0370258 | A1 | 12/2016 | Perez |
| 2016/0378306 | A1 | 12/2016 | Kresl et al. |
| 2016/0379326 | A1 | 12/2016 | Chan-Gove et al. |
| 2017/0006135 | A1 | 1/2017 | Siebel |

(56) References Cited

U.S. PATENT DOCUMENTS

2017/0011318 A1 1/2017 Vigano et al.
2017/0017221 A1 1/2017 Lamparter et al.
2017/0039255 A1 2/2017 Raj et al.
2017/0052536 A1 2/2017 Warner et al.
2017/0053441 A1 2/2017 Nadumane et al.
2017/0063894 A1 3/2017 Muddu et al.
2017/0068409 A1 3/2017 Nair
2017/0070775 A1 3/2017 Taxier et al.
2017/0075984 A1 3/2017 Deshpande et al.
2017/0084168 A1 3/2017 Janchookiat
2017/0090437 A1 3/2017 Veeramani et al.
2017/0093700 A1 3/2017 Gilley et al.
2017/0098086 A1 4/2017 Hoernecke et al.
2017/0103327 A1 4/2017 Penilla et al.
2017/0103403 A1 4/2017 Chu et al.
2017/0123389 A1 5/2017 Baez et al.
2017/0134415 A1 5/2017 Muddu et al.
2017/0177715 A1 6/2017 Chang et al.
2017/0180147 A1 6/2017 Brandman et al.
2017/0188216 A1 6/2017 Koskas et al.
2017/0212482 A1 7/2017 Boettcher et al.
2017/0212668 A1 7/2017 Shah et al.
2017/0220641 A1 8/2017 Chi et al.
2017/0230930 A1 8/2017 Frey
2017/0235817 A1 8/2017 Deodhar et al.
2017/0251182 A1 8/2017 Siminoff et al.
2017/0270124 A1 9/2017 Nagano et al.
2017/0277769 A1 9/2017 Pasupathy et al.
2017/0278003 A1 9/2017 Liu
2017/0294132 A1 10/2017 Colmenares
2017/0315522 A1 11/2017 Kwon et al.
2017/0315697 A1 11/2017 Jacobson et al.
2017/0322534 A1 11/2017 Sinha et al.
2017/0323389 A1 11/2017 Vavrasek
2017/0329289 A1 11/2017 Kohn et al.
2017/0336770 A1 11/2017 Macmillan
2017/0345287 A1 11/2017 Fuller et al.
2017/0351957 A1 12/2017 Lecue et al.
2017/0357225 A1 12/2017 Asp et al.
2017/0357490 A1 12/2017 Park et al.
2017/0357908 A1 12/2017 Cabadi et al.
2018/0012159 A1 1/2018 Kozloski et al.
2018/0013579 A1 1/2018 Fairweather et al.
2018/0024520 A1 1/2018 Sinha et al.
2018/0039238 A1 2/2018 Gärtner et al.
2018/0048485 A1 2/2018 Pelton et al.
2018/0069932 A1 3/2018 Tiwari et al.
2018/0102954 A1* 4/2018 Schubert ................. H04L 12/28
2018/0114140 A1 4/2018 Chen et al.
2018/0137288 A1 5/2018 Polyakov
2018/0157930 A1 6/2018 Rutschman et al.
2018/0162400 A1 6/2018 Abdar
2018/0176241 A1 6/2018 Manadhata et al.
2018/0198627 A1 7/2018 Mullins
2018/0203961 A1 7/2018 Aisu et al.
2018/0239982 A1 8/2018 Rutschman et al.
2018/0259209 A1 9/2018 Przybylski
2018/0259927 A1 9/2018 Przybylski et al.
2018/0259949 A1 9/2018 Przybylski et al.
2018/0260101 A1 9/2018 Przybylski et al.
2018/0260219 A1 9/2018 Przybylski
2018/0260248 A1 9/2018 Przybylski
2018/0260249 A1 9/2018 Przybylski
2018/0262360 A1 9/2018 Przybylski
2018/0262573 A1 9/2018 Przybylski et al.
2018/0275625 A1 9/2018 Park et al.
2018/0276962 A1 9/2018 Butler et al.
2018/0292797 A1 10/2018 Lamparter et al.
2018/0336785 A1 11/2018 Ghannam et al.
2018/0341234 A1 11/2018 Piaskowski et al.
2018/0356775 A1 12/2018 Harvey
2018/0359111 A1 12/2018 Harvey
2018/0364654 A1 12/2018 Locke et al.
2019/0005025 A1 1/2019 Malabarba
2019/0013023 A1 1/2019 Pourmohammad et al.
2019/0025771 A1 1/2019 Park et al.
2019/0037135 A1 1/2019 Hedge
2019/0042988 A1 2/2019 Brown et al.
2019/0088106 A1 3/2019 Grundstrom
2019/0094824 A1 3/2019 Xie et al.
2019/0096217 A1 3/2019 Pourmohammad et al.
2019/0102840 A1 4/2019 Perl et al.
2019/0121801 A1 4/2019 Jethwa et al.
2019/0138512 A1 5/2019 Pourmohammad et al.
2019/0147883 A1 5/2019 Mellenthin et al.
2019/0158309 A1 5/2019 Park et al.
2019/0163152 A1 5/2019 Worrall et al.
2019/0268178 A1 8/2019 Fairweather et al.
2019/0310979 A1 10/2019 Masuzaki et al.
2019/0377306 A1 12/2019 Harvey
2020/0226156 A1 7/2020 Borra et al.
2020/0285203 A1 9/2020 Thakur et al.
2020/0336328 A1 10/2020 Harvey
2020/0348632 A1 11/2020 Harvey
2020/0387576 A1 12/2020 Brett et al.
2020/0396208 A1 12/2020 Brett et al.
2021/0042299 A1 2/2021 Migliori
2021/0043221 A1 2/2021 Yelchuru et al.
2021/0191826 A1 6/2021 Duraisingh et al.
2021/0325070 A1 10/2021 Endel et al.
2021/0342961 A1 11/2021 Winter et al.
2021/0381711 A1 12/2021 Harvey et al.
2021/0381712 A1 12/2021 Harvey et al.
2021/0382445 A1 12/2021 Harvey et al.
2021/0383041 A1 12/2021 Harvey et al.
2021/0383042 A1 12/2021 Harvey et al.
2021/0383200 A1 12/2021 Harvey et al.
2021/0383219 A1 12/2021 Harvey et al.
2021/0383235 A1 12/2021 Harvey et al.
2021/0383236 A1 12/2021 Harvey et al.
2022/0066402 A1 3/2022 Harvey et al.
2022/0066405 A1 3/2022 Harvey
2022/0066432 A1 3/2022 Harvey et al.
2022/0066434 A1 3/2022 Harvey et al.
2022/0066528 A1 3/2022 Harvey et al.
2022/0066722 A1 3/2022 Harvey et al.
2022/0066754 A1 3/2022 Harvey et al.
2022/0066761 A1 3/2022 Harvey et al.
2022/0067226 A1 3/2022 Harvey et al.
2022/0067227 A1 3/2022 Harvey et al.
2022/0067230 A1 3/2022 Harvey et al.
2022/0069863 A1 3/2022 Harvey et al.
2022/0070293 A1 3/2022 Harvey et al.
2022/0121965 A1 4/2022 Chatterji et al.
2022/0138684 A1 5/2022 Harvey
2022/0147000 A1 5/2022 Cooley et al.
2022/0150124 A1 5/2022 Cooley et al.
2022/0215264 A1 7/2022 Harvey et al.
2022/0405327 A1 12/2022 Swanson et al.
2023/0010757 A1 1/2023 Preciado
2023/0071312 A1 3/2023 Preciado et al.
2023/0076011 A1 3/2023 Preciado et al.
2023/0083703 A1 3/2023 Meiners

FOREIGN PATENT DOCUMENTS

CN 101415011 A 4/2009
CN 102136099 A 7/2011
CN 102136100 A 7/2011
CN 102650876 A 8/2012
CN 104040583 A 9/2014
CN 104603832 A 5/2015
CN 104919484 A 9/2015
CN 106204392 A 12/2016
CN 106406806 A 2/2017
CN 106960269 A 7/2017
CN 107147639 A1 9/2017
CN 107598928 A 1/2018
EP 2 528 033 A1 11/2012
EP 3 268 821 B1 1/2018
EP 3 324 306 A1 5/2018
EP 4 226 263 A1 8/2023
JP H10-049552 A 2/1998
JP 2003-162573 A 6/2003

(56) References Cited

FOREIGN PATENT DOCUMENTS

| | | | |
|---|---|---|---|
| JP | 2007-018322 | A | 1/2007 |
| JP | 4073946 | B1 | 4/2008 |
| JP | 2008-107930 | A | 5/2008 |
| JP | 2013-152618 | A | 8/2013 |
| JP | 2014-044457 | A | 3/2014 |
| KR | 2016/0102923 | A | 8/2016 |
| WO | WO-2009/020158 | A1 | 2/2009 |
| WO | WO-2011/100255 | A2 | 8/2011 |
| WO | WO-2013/050333 | A1 | 4/2013 |
| WO | WO-2015/106702 | A1 | 7/2015 |
| WO | WO-2015/145648 | A1 | 10/2015 |
| WO | WO-2017/035536 | A1 | 3/2017 |
| WO | WO-2017/192422 | A1 | 11/2017 |
| WO | WO-2017/194244 | A1 | 11/2017 |
| WO | WO-2017/205330 | A1 | 11/2017 |
| WO | WO-2017/213918 | A1 | 12/2017 |
| WO | WO-2018/132112 | A1 | 7/2018 |
| WO | WO-2020/061621 | A1 | 4/2020 |
| WO | WO-2021/138245 | A1 | 7/2021 |
| WO | WO-2022/042925 | A1 | 3/2022 |
| WO | WO-2022/103812 | A1 | 5/2022 |
| WO | WO-2022/103813 | A1 | 5/2022 |
| WO | WO-2022/103820 | A1 | 5/2022 |
| WO | WO-2022/103822 | A1 | 5/2022 |
| WO | WO-2022/103824 | A1 | 5/2022 |
| WO | WO-2022/103829 | A1 | 5/2022 |
| WO | WO-2022/103831 | A1 | 5/2022 |

OTHER PUBLICATIONS

Balaji et al, "Brick: Metadata schema for portable smart building applications," Applied Energy, Sep. 15, 2018, 3 pages, (Abstract).

Balaji et al, "Demo Abstract: Portable Queries Using the Brick Schema for Building Applications," BuildSys '16, Palo Alto, CA, USA, Nov. 16-17, 2016 (2 pages).

Balaji, B. et al., "Brick: Towards a Unified Metadata Schema For Buildings." BuildSys '16, Palo Alto, CA, USA, Nov. 16-17, 2016 (10 pages).

Bhattacharya et al., "Short Paper: Analyzing Metadata Schemas for Buildings—The Good, The Bad and The Ugly," BuildSys '15, Seoul, South Korea, Nov. 4-5, 2015 (4 pages).

Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).

Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).

Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).

Brick, "Metadata Schema for Buildings," URL: https://brickschema.org/docs/Brick-Leaflet.pdf, retrieved from internet Dec. 24, 2019 (3 pages).

Chinese Office Action on CN Appl. No. 201780003995.9 dated Apr. 8, 2021 (21 pages with English language translation).

Chinese Office action on CN Appl. No. 201780043400.2 dated Apr. 25, 2021 (15 pages with English language translation).

Curry, E. et al., "Linking building data in the cloud: Integrating cross-domain building data using linked data." Advanced Engineering Informatics, 2013, 27 (pp. 206-219).

Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).

Digital Platform Litigation Documents Part 10, includes DDE-1-21-cv-01796 (documents filedNov. 1, 2022-Dec. 22, 2021 (1795 pages total).

Digital Platform Litigation Documents Part 2, includes IPR2023-00085 (documents filed Oct. 20, 2022) (172 pages total).

Digital Platform Litigation Documents Part 3, includes IPR2023-00085 (documents filed Oct. 20, 2022) and IPR2023-00170 (documents filed Nov. 28, 2022-Nov. 7, 2022) (397 pages total).

Digital Platform Litigation Documents Part 4, includes IPR2023-00170 (documents filed Nov. 7, 2022) and IPR2023-00217 (documents filed Jan. 18, 2023-Nov. 15, 2022) (434 pages total).

Digital Platform Litigation Documents Part 5, includes IPR2023-00217 (documents filed Nov. 15, 2022) and IPR2023-00257 (documents filed Jan. 25, 2023-Nov. 23, 2022) (316 pages total).

Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).

Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).

Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).

Digital Platform Litigation Documents Part 9, includes DDE-1-21-cv-01796 (documents filed Jan. 10, 2023-Nov. 11, 2022 (203 pages total).

El Kaed, C. et al., "Building management insights driven by a multi-system semantic representation approach," 2016 IEEE 3rd World Forum on Internet of Things (WF-IoT), Dec. 12-14, 2016, (pp. 520-525).

Ellis, C. et al., "Creating a room connectivity graph of a building from per-room sensor units." BuildSys '12, Toronto, ON, Canada, Nov. 6, 2012 (7 pages).

Extended European Search Report on EP Application No. 18196948.6 dated Apr. 10, 2019 (9 pages).

Fierro et al., "Beyond a House of Sticks: Formalizing Metadata Tags with Brick," BuildSys '19, New York, NY, USA, Nov. 13-14, 2019 (10 pages).

Fierro et al., "Dataset: An Open Dataset and Collection Tool for BMS Point Labels," DATA'19, New York, NY, USA, Nov. 10, 2019 (3 pages).

Fierro et al., "Design and Analysis of a Query Processor for Brick," ACM Transactions on Sensor Networks, Jan. 2018, vol. 1, No. 1, art. 1 (25 pages).

Fierro et al., "Design and Analysis of a Query Processor for Brick," BuildSys '17, Delft, Netherlands, Nov. 8-9, 2017 (10 pages).

Fierro et al., "Mortar: An Open Testbed for Portable Building Analytics," BuildSys '18, Shenzhen, China, Nov. 7-8, 2018 (10 pages).

Fierro et al., "Why Brick is a Game Changer for Smart Buildings," URL: https://brickschema.org/papers/Brick_Memoori_Webinar_Presentation.pdf, Memoori Webinar, 2019 (67 pages).

Fierro, "Writing Portable Building Analytics with the Brick Metadata Schema," UC Berkeley, ACM E-Energy, 2019 (39 pages).

Fierro, G., "Design of an Effective Ontology and Query Processor Enabling Portable Building Applications," Electrical Engineering and Computer Sciences, University of California at Berkeley, Technical Report No. UCB/EECS-2019-106, Jun. 27, 2019 (118 pages).

File History for U.S. Appl. No. 12/776,159, filed May 7, 2010 (722 pages).

Final Conference Program, ACM BuildSys 2016, Stanford, CA, USA, Nov. 15-17, 2016 (7 pages).

Gao et al., "A large-scale evaluation of automated metadata inference approaches on sensors from air handling units," Advanced Engineering Informatics, 2018, 37 (pp. 14-30).

Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).

Harvey, T., "Quantum: The Digital Twin Standard for Buildings," URL: https://www.automatedbuildings.com/news/feb21/articles/passivelogic/210127124501passivelogic.html, Feb. 2021 (6 pages).

(56) References Cited

OTHER PUBLICATIONS

Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL:https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing Ltd., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Zhou, Q. et al., "Knowledge-infused and Consistent Complex Event Processing over Real-time and Persistent Streams," Further Generation Computer Systems, 2017, 76 (pp. 391-406).
U.S. Appl. No. 17/566,029, filed Not Available, Passivelogic, Inc.
U.S. Appl. No. 17/567,275, filed Not Available, Passivelogic, Inc.
U.S. Appl. No. 17/722,115, filed Not Available, Passivelogic, Inc.

* cited by examiner

BUILDING SYSTEM WITH INVOLVEMENT FEATURES

CROSS-REFERENCE TO RELATED PATENT APPLICATIONS

This application is a continuation-in-part of U.S. patent application Ser. No. 16/688,440, filed Nov. 19, 2019. This application also claims the benefit of and priority to Indian Provisional Patent Application No. 202221004267, filed Jan. 25, 2022. Both of these patent applications are incorporated herein by reference in their entireties.

BACKGROUND

The present disclosure relates generally to a user interface for viewing information relating to a building management system (BMS). A BMS is, in general, a system of devices configured to control, monitor, and manage equipment in or around a building or building area. A BMS can include, for example, a heating, ventilation, and air conditioning (HVAC) system, a security system, a lighting system, a fire alerting system, any other system that is capable of managing building functions or devices, or any combination thereof.

Information about the BMS is typically accessed via a user interface generated by the BMS. A user may access the user interface via a user device such as a desktop, laptop, tablet, or mobile device. The user may generally access information about one or more spaces within the BMS, or one or more equipment within the BMS. For example, a user may view the current status of an area (e.g., occupancy, temperature, etc.), the current status of equipment (e.g., if equipment requires maintenance or replacement, if the equipment is malfunctioning), or any alarms or warning relating to the building or BMS.

Individual components within the BMS may have a wide-ranging impact on other components and various spaces in the BMS. For example, a change in the operation of a piece of equipment may impact multiple spaces and multiple BMS systems (e.g., an adjustment of a control strategy of an air handling unit of a HVAC system may negatively impact the performance of the HVAC system, causing additional energy to be used or a setpoint to not be reached). When such a change or other issue occurs in a BMS with a particular piece of equipment, space, or system, it may be difficult to diagnose the change or issue. Accordingly, it would be desirable to have systems and methods for generating a user interface that can provide users with information about how the operation of the various components of a BMS affect each other.

SUMMARY

One implementation of the present disclosure relates to a building system for a building having one or more building subsystems. The building system includes one or more memory devices. The one or more memory devices have instructions stored thereon that, when executed by one or more processors, cause the one or more processors to acquire a selection of a first object where the first object represents a component of the one or more building subsystems, acquire information regarding one or more second objects associated with the first object where the information includes an involvement type for a relationship between the first object and each of the one or more second objects, and generate an involvement map for display via a graphical user interface. The involvement map includes a first indicia representing the first object and one or more second indicia representing each of the one or more second objects. The first indicia and each of the one or more second indicia are connected via a connector line. The connector line includes the involvement type disposed therealong.

Another implementation of the present disclosure relates to a method for providing a graphical user interface that displays involvement between components of one or more building subsystems. The method includes acquiring, by one or more processing circuits, a selection of a first object where the first object represents a component of the one or more building subsystems; acquiring, by the one or more processing circuits, information regarding one or more second objects associated with the first object here the information includes an involvement type for a relationship between the first object and each of the one or more second objects; and generating, by the one or more processing circuits, an involvement map for display via the graphical user interface. The involvement map includes a first indicia representing the first object and one or more second indicia representing each of the one or more second objects. The first indicia and each of the one or more second indicia are connected via a respective connector line. The respective connector line includes the involvement type disposed therealong. The involvement type indicates whether the relationship between the first object represented by the first indicia and a respective second object of the one or more second objects represented by a respective one of the one or more second indicia is a referential involvement, a command involvement, or an unbound involvement.

Still another implementation of the present disclosure relates to a building system for a building having one or more building subsystems. The building system includes one or more memory devices. The one or more memory devices have instructions stored thereon that, when executed by one or more processors, cause the one or more processors to acquire a selection of a first object where the first object represents a component of the one or more building subsystems, acquire the information regarding one or more second objects and one or more third objects associated with the first object where (i) the information includes an involvement type for a relationship between (a) the first object and each of the one or more second objects and (b) the first object and each of the one or more third objects, (ii) the one or more second objects have an upstream involvement with the first object, and (iii) the one or more third objects have a downstream involvement with the first object, and generate an involvement map for display via a graphical user interface. The involvement map includes a first indicia representing the first object, one or more second indicia representing each of the one or more second objects, and one or more third indicia representing each of the one or more third objects. (a) The first indicia and each of the one or more second indicia and (b) the first indicia and the each of the one or more third indicia are connected via a respective connector line. The respective connector line includes the involvement type disposed therealong. The involvement type indicates whether the relationship between (a) the first object represented by the first indicia and (b) a respective second object of the one or more second objects represented by a respective one of the one or more second indicia or a respective third object of the one or more third objects represented by a respective one of the one or more third indicia is a referential involvement, a command involvement, or an unbound involvement.

DETAILED DESCRIPTION

Overview

Figure 1:
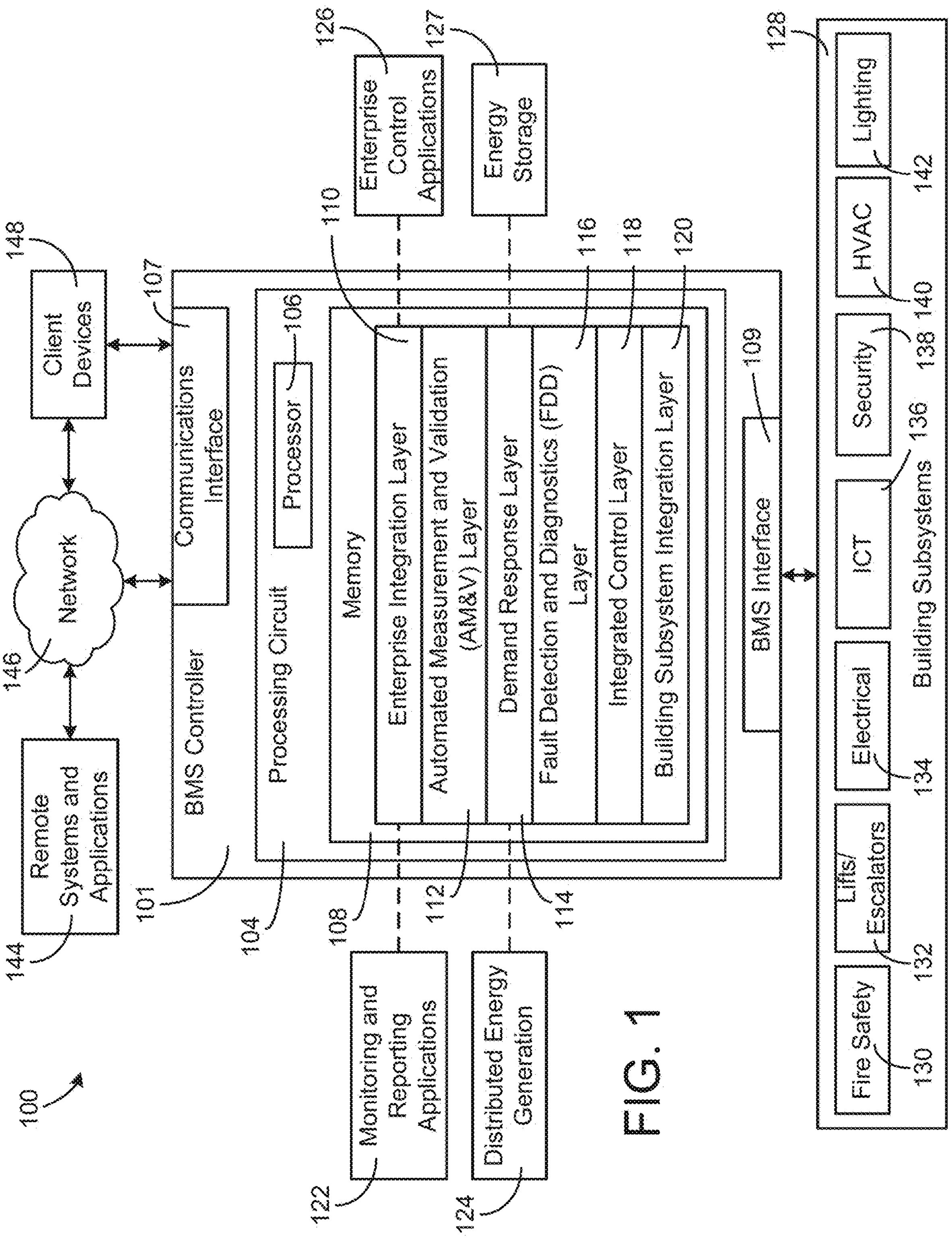
FIG. 1 is a high-level block diagram of a BMS including a BMS controller, according to some embodiments.

Referring generally to the figures, systems and methods for providing a user interface for monitoring and controlling multiple components in a BMS are shown, according to exemplary embodiments. More particularly, the user interface described herein is configured to provide information about the relationship between various components in the BMS and the control logic associated with the components.

In a BMS, a supervisory level controller may generally implement supervisory level control for the various components of a BMS. The supervisory level controller may, for example, provide a general control strategy for multiple components of a BMS, without providing instructions for individual controllers for an individual component or piece of equipment. The relationship between the supervisory level control and the control of individual components or objects in a BMS may generally be inaccessible or not understandable due to the complexity of the BMS.

In some embodiments, a user may access such information via a user interface. For example, on the user interface, the user may select an object representing a component in the BMS (e.g., a piece of equipment, a building area, a subsystem, etc.). The object may include references to other objects in the BMS related to the object. The user may run a report that shows the relationship between the object and other objects. However, it may be difficult for a user to see how the high level control from the supervisory controller affects the object.

The user interface described herein may be configured to provide an interactive view that can be used to understand what is affecting an object in the BMS. The user interface may be used to identify software objects, user actions, and high-level control logic what affect the object. Further, the user interface may identify a control sequence and allow a user to traverse the control sequence at any level in the control "chain." In other words, the user may view how control logic impacts each individual object in the BMS impacted by the control logic. This allows the user to more clearly understand why a particular condition is occurring for an object in a BMS in response to the implementation of control logic.

In some implementations, the user interface provides an interactive view at an equipment level, allowing the user to see the impact of control logic for a piece of equipment and all other related pieces of equipment (i.e., all equipment impacted by the specific piece of equipment). In other implementations, the user interface provides an interactive view at a space level, allowing the user to see the impact of control logic for all components in a particular space.

At any level in the control sequence, the user interface may be configured to provide an indication of any user change that affects the object, equipment, or space represented at the level in the control sequence shown. This allows the user to gain a better understanding of how a user change affects a specific piece of equipment, or how a user change affects the overall control strategy in the BMS.

Building Management System and HVAC System

Referring now to FIG. 1, a block diagram of a BMS 100 is shown, according to an exemplary embodiment. BMS 100 is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. BMS 100 is generally described in the present disclosure as serving a building or building area; in other embodiments BMS 100 may be configured to serve multiple buildings (e.g., a campus).

BMS controller 101 can include one or more computer systems (e.g., servers, supervisory controllers, subsystem controllers, etc.) that serve as system level controllers, application or data servers, head nodes, or master controllers for serving a building or building area. BMS controller 101 can communicate with multiple downstream building systems or subsystems (e.g., a HVAC system, a security system, a lighting system, etc.) via a communications link according to like or disparate protocols (e.g., LON, BACnet, etc.).

BMS 100 can be implemented in a building to automatically monitor and control various building functions. BMS 100 is shown to include a BMS controller 101 and a plurality of building subsystems 128. Building subsystems 128 are shown to include a fire safety subsystem 130, a lift/escalators subsystem 132, a building electrical subsystem 134, an information communication technology (ICT) subsystem 136, a security subsystem 138, a HVAC subsystem 140, and a lighting subsystem 142. In various embodiments, building subsystems 128 can include fewer, additional, or alternative subsystems. For example, building subsystems 128 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control a building. In some embodiments, building subsystems 128 and more particularly HVAC subsystem 140 can include a waterside system and/or an airside system.

Each of building subsystems 128 can include any number of devices, controllers, and connections for completing its individual functions and control activities. HVAC subsystem 140 can include, for example, a chiller, a boiler, any number of air handling units, economizers, field controllers, supervisory controllers, actuators, temperature sensors, and other devices for controlling the temperature, humidity, airflow, or other variable conditions within a building. Lighting subsystem 142 can include any number of light fixtures, ballasts, lighting sensors, dimmers, or other devices configured to controllably adjust the amount of light provided to a building space. Security subsystem 138 can include occupancy sensors, video surveillance cameras, digital video recorders, video processing servers, intrusion detection devices, access control devices (e.g., card access, etc.) and servers, or other security-related devices.

BMS controller 101 is shown to include a communications interface 107 and a BMS interface 109. Communications interface 107 can facilitate communications between BMS controller 101 and external applications (e.g., monitoring and reporting applications 122, enterprise control applications 126, remote systems and applications 144, applications residing on client devices 148, etc.) for allowing user control, monitoring, and adjustment to BMS controller 101 and/or subsystems 128. Communications interface 107 can also facilitate communications between BMS controller 101 and client devices 148. BMS interface 109 can facilitate communications between BMS controller 101 and building subsystems 128 (e.g., HVAC, lighting security, lifts, power distribution, business, etc.).

Interfaces 107, 109 can be or include wired or wireless communications interfaces (e.g., jacks, antennas, transmitters, receivers, transceivers, wire terminals, etc.) for conducting data communications with building subsystems 128 or other external systems or devices. In various embodiments, communications via interfaces 107, 109 can be direct (e.g., locally wired or wireless communications) or via a communications network 146 (e.g., a WAN, the Internet, a cellular network, etc.). For example, interfaces 107, 109 can include an Ethernet card and port for sending and receiving data via an Ethernet-based communications link or network. In another example, the interfaces 107, 109 can include a WI-FI® transceiver for communicating via a wireless communications network. In another example, one or both of interfaces 107, 109 can include cellular or mobile phone communications transceivers. In one embodiment, communications interface 107 is a power line communications interface and BMS interface 109 is an Ethernet interface. In other embodiments, communications interface 107 and BMS interface 109 are Ethernet interfaces or are the same Ethernet interface.

BMS controller 101 is shown to include a processing circuit 104 including a processor 106 and memory 108. Processing circuit 104 can be communicably connected to BMS interface 109 and/or communications interface 107 such that processing circuit 104 and the various components thereof can send and receive data via interfaces 107, 109. Processor 106 can be implemented as a general purpose processor, an application specific integrated circuit (ASIC), one or more field programmable gate arrays (FPGAs), a group of processing components, or other suitable electronic processing components.

Memory 108 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 108 can be or include volatile memory or non-volatile memory. Memory 108 can include database components, object code components, script components, or any other type of information structure for supporting the various activities and information structures described in the present application. According to an exemplary embodiment, memory 108 is communicably connected to processor 106 via processing circuit 104 and includes computer code for executing (e.g., by processing circuit 104 and/or processor 106) one or more processes described herein.

In some embodiments, BMS controller 101 is implemented within a single computer (e.g., one server, one housing, etc.). In various other embodiments BMS controller 101 can be distributed across multiple servers or computers (e.g., that can exist in distributed locations). Further, while FIG. 1 shows applications 122 and 126 as existing outside of BMS controller 101, in some embodiments, applications 122 and 126 can be hosted within BMS controller 101 (e.g., within memory 108).

Memory 108 is shown to include an enterprise integration layer 110, an automated measurement and validation (AM&V) layer 112, a demand response (DR) layer 114, a fault detection and diagnostics (FDD) layer 116, an integrated control layer 118, and a building subsystem integration later 120. Layers 110-120 can be configured to receive inputs from building subsystems 128 and other data sources, determine optimal control actions for building subsystems 128 based on the inputs, generate control signals based on the optimal control actions, and provide the generated control signals to building subsystems 128. The following paragraphs describe some of the general functions performed by each of layers 110-120 in BMS 100.

Enterprise integration layer 110 can be configured to serve clients or local applications with information and services to support a variety of enterprise-level applications. For example, enterprise control applications 126 can be configured to provide subsystem-spanning control to a graphical user interface (GUI) or to any number of enterprise-level business applications (e.g., accounting systems, user identification systems, etc.). Enterprise control applications 126 can also or alternatively be configured to provide configuration GUIs for configuring BMS controller 101. In yet other embodiments, enterprise control applications 126 can work with layers 110-120 to optimize building performance (e.g., efficiency, energy use, comfort, or safety) based on inputs received at interface 107 and/or BMS interface 109.

Building subsystem integration layer 120 can be configured to manage communications between BMS controller 101 and building subsystems 128. For example, building subsystem integration layer 120 can receive sensor data and input signals from building subsystems 128 and provide output data and control signals to building subsystems 128. Building subsystem integration layer 120 can also be configured to manage communications between building subsystems 128. Building subsystem integration layer 120 translates communications (e.g., sensor data, input signals, output signals, etc.) across a plurality of multi-vendor/multi-protocol systems.

Demand response layer 114 can be configured to optimize resource usage (e.g., electricity use, natural gas use, water use, etc.) and/or the monetary cost of such resource usage in response to satisfy the demand of a building. The optimization can be based on time-of-use prices, curtailment signals, energy availability, or other data received from utility providers, distributed energy generation systems 124, from energy storage 127, or from other sources. Demand response layer 114 can receive inputs from other layers of BMS controller 101 (e.g., building subsystem integration layer 120, integrated control layer 118, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 114 includes control logic for responding to the data and signals it receives. These responses can include communicating with the control algorithms in integrated control layer 118, changing control strategies, changing setpoints, or activating/deactivating building equipment or subsystems in a controlled manner. Demand response layer 114 can also include control logic configured to determine when to utilize stored energy. For example, demand response layer 114 can determine to begin using energy from energy storage 127 just prior to the beginning of a peak use hour.

In some embodiments, demand response layer 114 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 114 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 114 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 118 can be configured to use the data input or output of building subsystem integration layer 120 and/or demand response later 114 to make control decisions. Due to the subsystem integration provided by building subsystem integration layer 120, integrated control layer 118 can integrate control activities of the subsystems 128 such that the subsystems 128 behave as a single integrated supersystem. In an exemplary embodiment, integrated control layer 118 includes control logic that uses inputs and outputs from a plurality of building subsystems to provide greater comfort and energy savings relative to the comfort and energy savings that separate subsystems could provide alone. For example, integrated control layer 118 can be configured to use an input from a first subsystem to make an energy-saving control decision for a second subsystem. Results of these decisions can be communicated back to building subsystem integration layer 120.

Integrated control layer 118 is shown to be logically below demand response layer 114. Integrated control layer 118 can be configured to enhance the effectiveness of demand response layer 114 by enabling building subsystems 128 and their respective control loops to be controlled in coordination with demand response layer 114. This configuration may advantageously reduce disruptive demand response behavior relative to conventional systems. For example, integrated control layer 118 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 118 can be configured to provide feedback to demand response layer 114 so that demand response layer 114 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 118 is also logically below fault detection and diagnostics layer 116 and automated measurement and validation layer 112. Integrated control layer 118 can be configured to provide calculated inputs (e.g., aggregations) to these higher levels based on outputs from more than one building subsystem.

Automated measurement and validation (AM&V) layer 112 can be configured to verify that control strategies commanded by integrated control layer 118 or demand response layer 114 are working properly (e.g., using data aggregated by AM&V layer 112, integrated control layer

118, building subsystem integration layer 120, FDD layer 116, or otherwise). The calculations made by AM&V layer 112 can be based on building system energy models and/or equipment models for individual BMS devices or subsystems. For example, AM&V layer 112 can compare a model-predicted output with an actual output from building subsystems 128 to determine an accuracy of the model.

Fault detection and diagnostics (FDD) layer 116 can be configured to provide on-going fault detection for building subsystems 128, building subsystem devices (i.e., building equipment), and control algorithms used by demand response layer 114 and integrated control layer 118. FDD layer 116 can receive data inputs from integrated control layer 118, directly from one or more building subsystems or devices, or from another data source. FDD layer 116 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 116 can be configured to output a specific identification of the faulty component or cause of the fault (e.g., loose damper linkage) using detailed subsystem inputs available at building subsystem integration layer 120. In other exemplary embodiments, FDD layer 116 is configured to provide "fault" events to integrated control layer 118 which executes control strategies and policies in response to the received fault events. According to an exemplary embodiment, FDD layer 116 (or a policy executed by an integrated control engine or business rules engine) can shut-down systems or direct control activities around faulty devices or systems to reduce energy waste, extend equipment life, or ensure proper control response.

FDD layer 116 can be configured to store or access a variety of different system data stores (or data points for live data). FDD layer 116 can use some content of the data stores to identify faults at the equipment level (e.g., specific chiller, specific AHU, specific terminal unit, etc.) and other content to identify faults at component or subsystem levels. For example, building subsystems 128 can generate temporal (i.e., time-series) data indicating the performance of BMS 100 and the various components thereof. The data generated by building subsystems 128 can include measured or calculated values that exhibit statistical characteristics and provide information about how the corresponding system or process (e.g., a temperature control process, a flow control process, etc.) is performing in terms of error from its set-point. These processes can be examined by FDD layer 116 to expose when the system begins to degrade in performance and alert a user to repair the fault before it becomes more severe.

User Interface System

Figure 2:
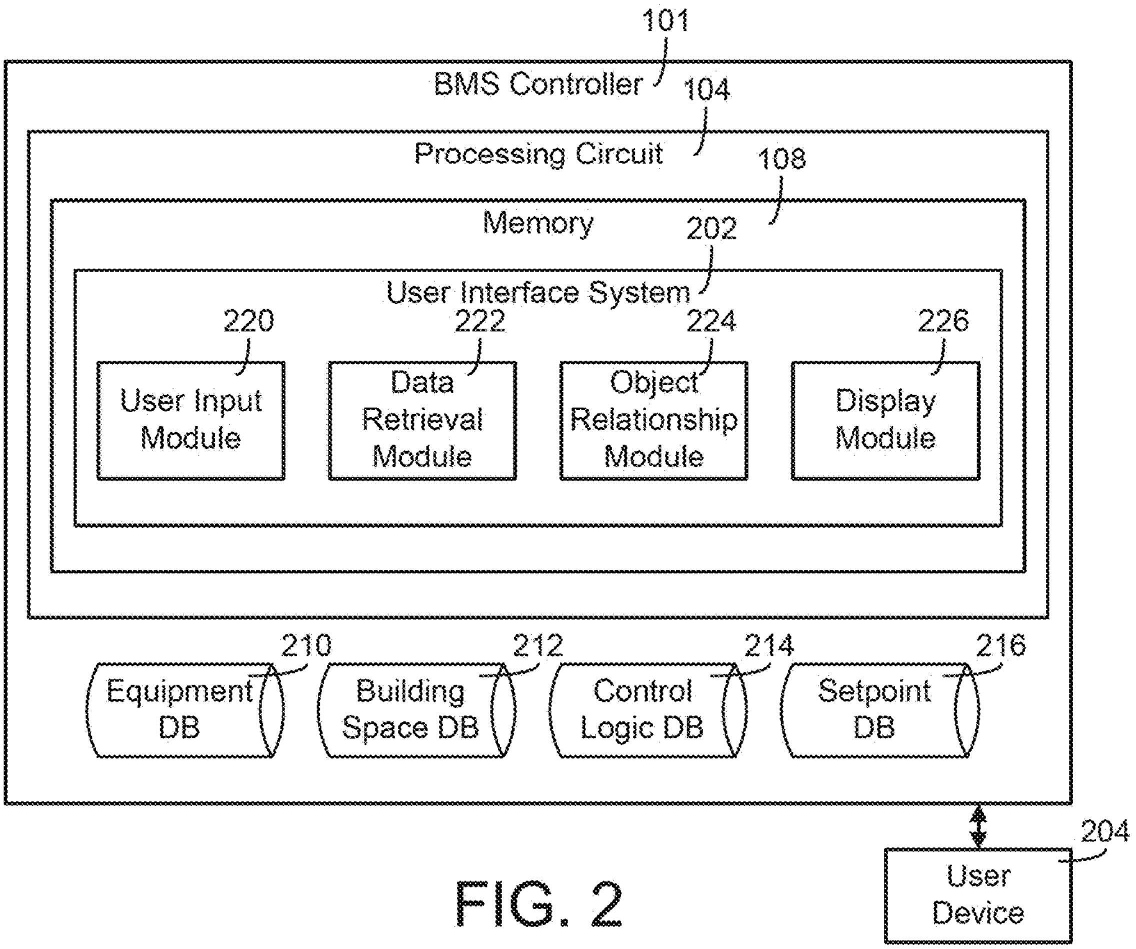
FIG. 2 is a detailed block diagram of the BMS controller of FIG. 1 and more particularly a user interface system of the BMS controller, according to some embodiments.

Referring now to FIG. 2, a detailed block diagram of BMS controller 101 is shown in greater detail. More particularly, memory 108 of BMS controller 101 is shown to include a user interface system 202. While FIG. 2 describes user interface system 202 in greater detail, it should be understood that BMS controller 101 and memory 108 may further include any number of managers, sub-systems, and modules, and may provide various BMS features for a building or building area beyond what is described in the present disclosure.

User interface system 202 may generally be configured to generate an interactive user interface for display on a user device 204. The interactive user interface may generally display information relating to a particular object (e.g., a piece of equipment of a building subsystem, a building area, etc.) and the relationship between the object and other objects in the building. In the present disclosure, the term "object" is used to describe a particular piece of equipment, building area, or other individual aspect associated with a BMS (e.g., BMS 100); and it should be understood that the term is not limiting towards the type of information associated with the object.

User device 204 may be, for example, a workstation, a desktop, a laptop, a tablet, or a mobile device. In various embodiments, user device 204 may include a keyboard, a mouse, a touchscreen, or any other component for allowing the user to provide an input to user interface system 202. User device 204 may include any type of display, and user interface system 202 may generally be configured to generate a user interface compatible with the type of user device 204 wishing to access the user interface.

BMS controller 101 is shown to include various databases storing information relating to the various components of BMS 100. In some embodiments, the databases may be located and maintained within BMS controller 101; in other embodiments, the databases may be located remotely from BMS controller 101, and may be accessed by BMS controller 101 via a wired or wireless connection. Further, while each database shown in FIG. 2 is described as a single database, it should be understood that BMS 100 may include multiple databases storing the same type of information. For example, equipment information may be stored in multiple equipment databases instead of a single equipment database, and so forth. BMS 100 may be configured to maintain the various databases in any manner. For example, BMS 100 may maintain the control logic database to ensure that changes or updates to the high level control logic of BMS 100 are stored. Further, while databases are shown in FIG. 2, in other embodiments BMS controller 101 may retrieve the data described from any other type of source.

BMS controller 101 may include an equipment database 210 storing information relating to individual pieces of equipment in BMS 100. Equipment database 210 may store, for each piece of equipment, one or more subsystems to which the piece of equipment belongs, along with information about the functionality and operating parameters of the equipment. The information stored in equipment database 210 may further include relationships between different pieces of equipment. For example, for a given piece of equipment for a building subsystem, the other equipment in the building subsystem may be identified. When information about the equipment is then retrieved (i.e., by user interface system 202), the information may include the relationship the equipment has with other equipment in BMS 100.

BMS controller 101 may include a building space database 212 storing information relating to individual building spaces in the building. Building space database 212 may store information identifying each room in a building, each floor in a building, and multiple rooms, floors, or areas which are related to one another. For example, multiple rooms in a building may share a common area, the environment in a first room may impact the environment in a second room, and so forth. Building space database 212 may store information about each building area in a building and how the building areas are related.

BMS controller 101 may include a control logic database 214 storing information relating to the control of the various equipment and subsystems in BMS 100. Control logic database 214 may store, for example, high level control logic for BMS 100. The high level control logic may relate to a general strategy for operation of equipment in BMS 100. For example, BMS 100 may implement an energy savings strategy and may provide control logic for the various building subsystems to cause the building subsystems to use less power during operation. As another example, BMS 100 may implement control logic for a specific building subsystem (i.e., control logic to specifically control the temperature within the building via the HVAC system). Referring generally to the present disclosure, "high level control logic" may relate to control logic for all equipment in a building, for a particular subset of equipment in a building, or one or more specific building subsystems, or any combination thereof. In various embodiments, one or more BMS controllers may update the control logic for BMS 100 based on the current conditions and/or user input, and user interface system 202 may retrieve the updated control logic via control logic database 214 or via any other method.

BMS controller 101 may include a setpoint database 216 storing information relating to one or more setpoints for one or more building areas or spaces in the building. For example, setpoint database 216 may include one or more settings for a space (e.g., a temperature or other condition to be maintained in a building area). Setpoint database 216 may further include one or more settings for the operation of one or more pieces of equipment in BMS 100.

User interface system 202 is shown to include various modules for creating and updating an interactive user interface to be provided to user device 204. User interface system 202 is shown to include a user input module 220 configured to receive a user input via user device 204 and to interpret the input. For example, the user input may relate to the selection of a specific piece of equipment or specific building area to be displayed on the user interface. User input module 220 may be configured to identify the object associated with the user input (e.g., an object representing the piece of equipment or building area specified) and to identify other objects related to the object. The user may be configured to provide the user input via any type of selection (e.g., the selection of a link on the user interface, a selection from a menu, a text entry, a selection via a touch on a touchscreen, etc.).

User interface system 202 is further shown to include a data retrieval module 222. Based on the user input (as described in user input module 220), data retrieval module 222 may identify other pieces of equipment, and/or other building areas related to the identified object. Data retrieval module 222 may then retrieve data relevant to each of the equipment and spaces from databases 210-216 and other sources. Data retrieval module 222 may further retrieve data relating to a current status of the equipment and spaces. For example, data retrieval module 222 may retrieve performance data for a piece of equipment, the current environment (e.g., temperature) in a building area, and the like.

User interface system 202 is further shown to include an object relationship module 224. Using the identified object and the identified related equipment and spaces, object relationship module 224 may determine a relationship between the various components. Further, using data retrieved by data retrieval module 222, object relationship module 224 may determine which components have an impact on particular data points. For example, for a temperature data point for a building area, object relationship module 224 may identify all equipment used in maintaining the temperature in the building area.

Figure 3:
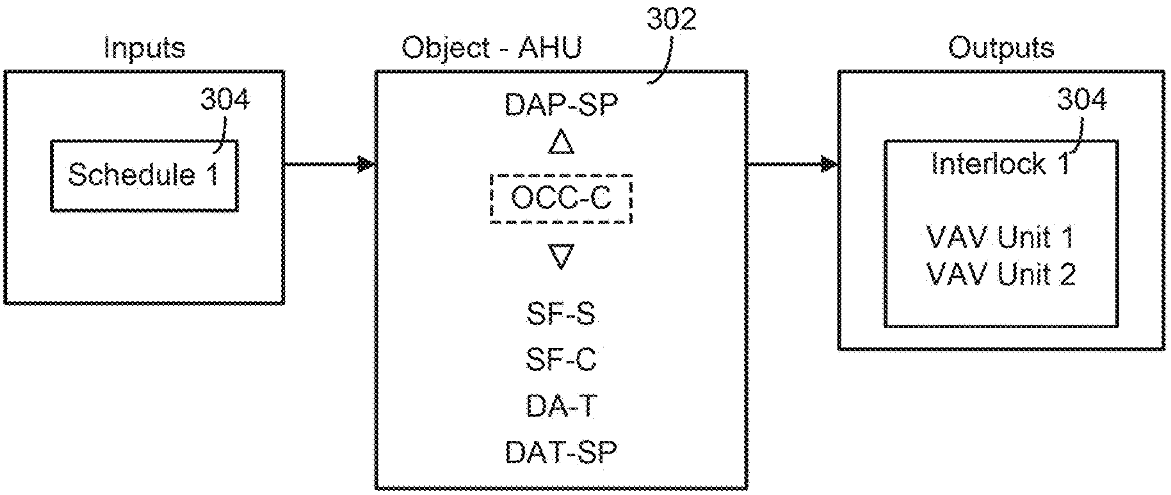
FIG. 3 is a block diagram illustrating a process which can be performed by the BMS controller of FIG. 1 for determining a relationship between an object and other components in a BMS, according to some embodiments.

Referring also to FIG. 3, a block diagram illustrating an example activity of object relationship module 224 is shown. In the example of FIG. 3, the object 302 selected by the user is an air handling unit (AHU) of an HVAC system. The AHU may be controlled via a control strategy that changes the air temperature in a building area over time.

Data retrieval module 222, based on the selection of object 302, may retrieve information, such as a schedule 304. Schedule 304 may indicate a desired temperature level for a building area over time. Schedule 304 may be set based on a general control strategy for a building, and may impact any number of building areas. For example, schedule 304 may be a schedule for a single piece of equipment, for all equipment in a building area, or for all areas in a building. Therefore, the information retrieved by data retrieval module 222 may include an indication that a change in the schedule may impact just a single building area or multiple building areas.

Object relationship module 224 may identify one or more values or setpoints which may be impacted by the AHU. For example, object relationship module 224 may identify a current temperature in a building area that the AHU is partially responsible for maintaining. Further, object relationship module 224 may identify a setpoint to be achieved in a building area that the AHU is partially responsible for maintaining. In the example of FIG. 3, object relationship module 224 has identified a duct static pressure setpoint (DAP-SP) and a discharge air temperature setpoint (DAT-SP) that the HVAC unit including the AHU is in charge of reaching. Further, object relationship module 224 has identified values relating to the current status of a building area the HVAC unit serves, such as the current occupancy status (OCC-C), supply fan status (SF-S) and discharge air temperature (DA-T). Further, object relationship module 224 has identified a command relating to the control of a supply fan of the AHU (SF-C). The example values and setpoints shown in FIG. 3 are not limiting; any number of values and setpoints may be identified.

Object relationship module 224, using the information and the identified values and setpoints, may provide an output 306 specifying one or more equipment, setpoints, or control strategies impacted by the object. In other words, object relationship module 224 identifies the components of BMS 100 that are impacted by the performance of the AHU. In the example shown in FIG. 3, object relationship module 224 has identified an interlock condition between two VAV units of an HVAC system. Since VAV units are generally configured to alter the air flow in a building area to maintain a temperature, a change in operation of the AHU may cause the VAV units to have to alter their operation to compensate. Further, the altering of the operation of one VAV unit may cause the operation of the second VAV unit to also be altered to maintain a temperature. The interlock condition defines a conditional control over one or more components based on the activity of other components.

User interface system 202 is further shown to include a display module 226 configured to generate the interactive user interface on user device 204. Display module 226 may generally be configured to provide a layout identifying the object selected by the user and objects for associated equipment and spaces. Display module 226 may show the link between the various components in any way. In various embodiments, the interactive user interface may make each object selectable in any way (e.g., via a link, button, menu option, via touchscreen, etc.).

Figure 4A:
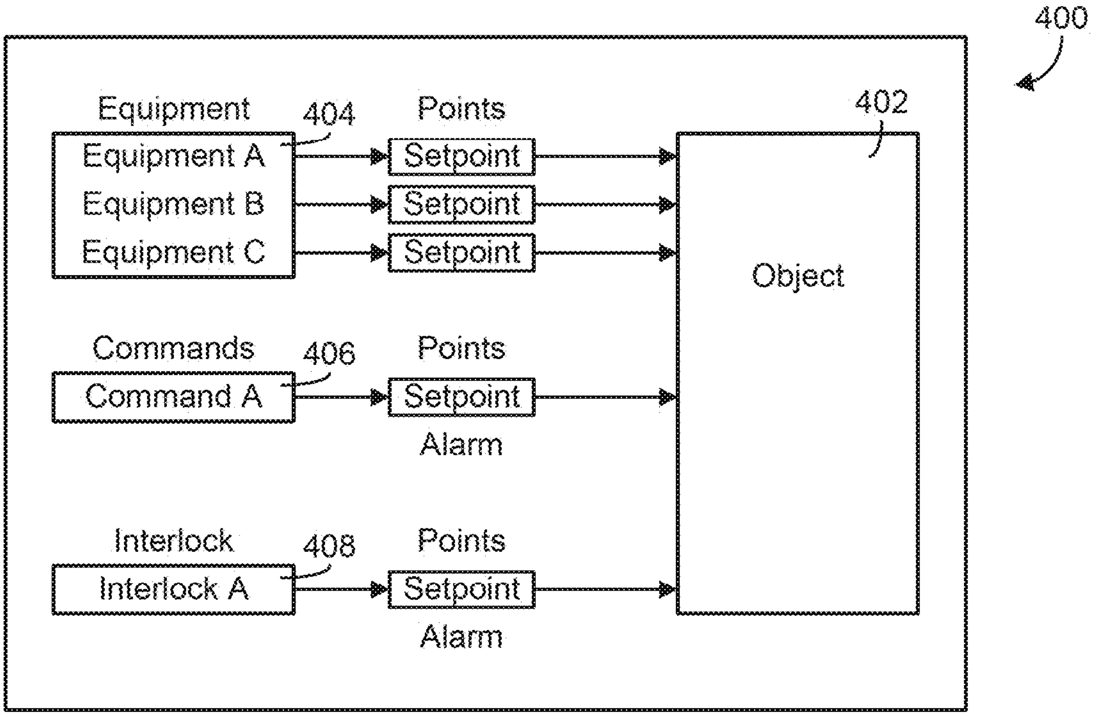
FIG. 4A is an example user interface layout that may be generated by the user interface system of FIG. 2, according to some embodiments.

Display module 226 may be configured to generate different layouts for different types of user devices. For example, referring to FIGS. 4A and 4B, two example generic layouts are illustrated. For a desktop or workstation with a relatively large monitor display, a layout similar to that shown in FIG. 4A may be generated. Layout 400 includes a main block 402 representing the object selected by the user. Layout 400 further includes blocks 404 representative of the multiple pieces of equipment, and of one or more setpoints associated with the operation of each equipment. Layout 400 may further include blocks 406 illustrating one or more commands that may control the operation of the object (e.g., control logic). Layout 400 may further include blocks 408 representative of one or more interlock conditions (e.g., features that makes the state of two different functions or components within BMS 100 mutually dependent on each other). The relationship between the various components and the object may be illustrated in any way. For example, in FIG. 4A, arrows are shown indicating that the various components impact the object.

Figure 4B:
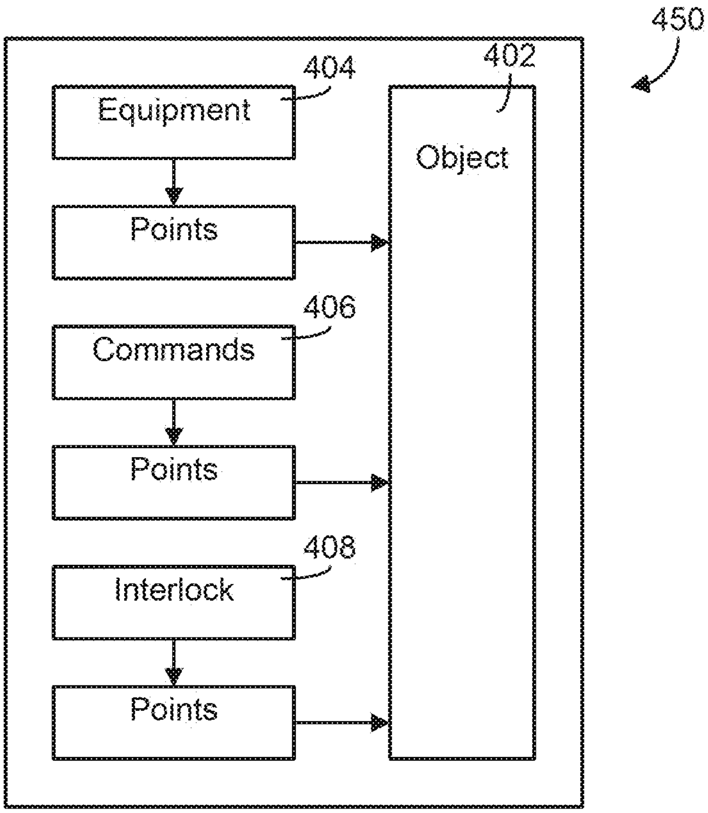
FIG. 4B is an example user interface layout for a mobile device that may be generated by the user interface system of FIG. 2, according to some embodiments.

For a mobile device or other device with a relatively small display, a layout similar to that shown in FIG. 4B may be generated. Layout 450 may include the same general information as described with respect to FIG. 4A, compacted into a smaller area on the screen. It should be understood that the various components displayed on the user interface may be organized in any way.

As yet another example of an output from display module 226, the user interface may have a similar structure as that shown in FIG. 3. The user interface may display the input and output (e.g., the data and other information identified as impacting the object, and the components affected by the object). The user interface may further display values for parameters the object is responsible for maintaining, and setpoints that the object is responsible for reaching.

Figure 5:
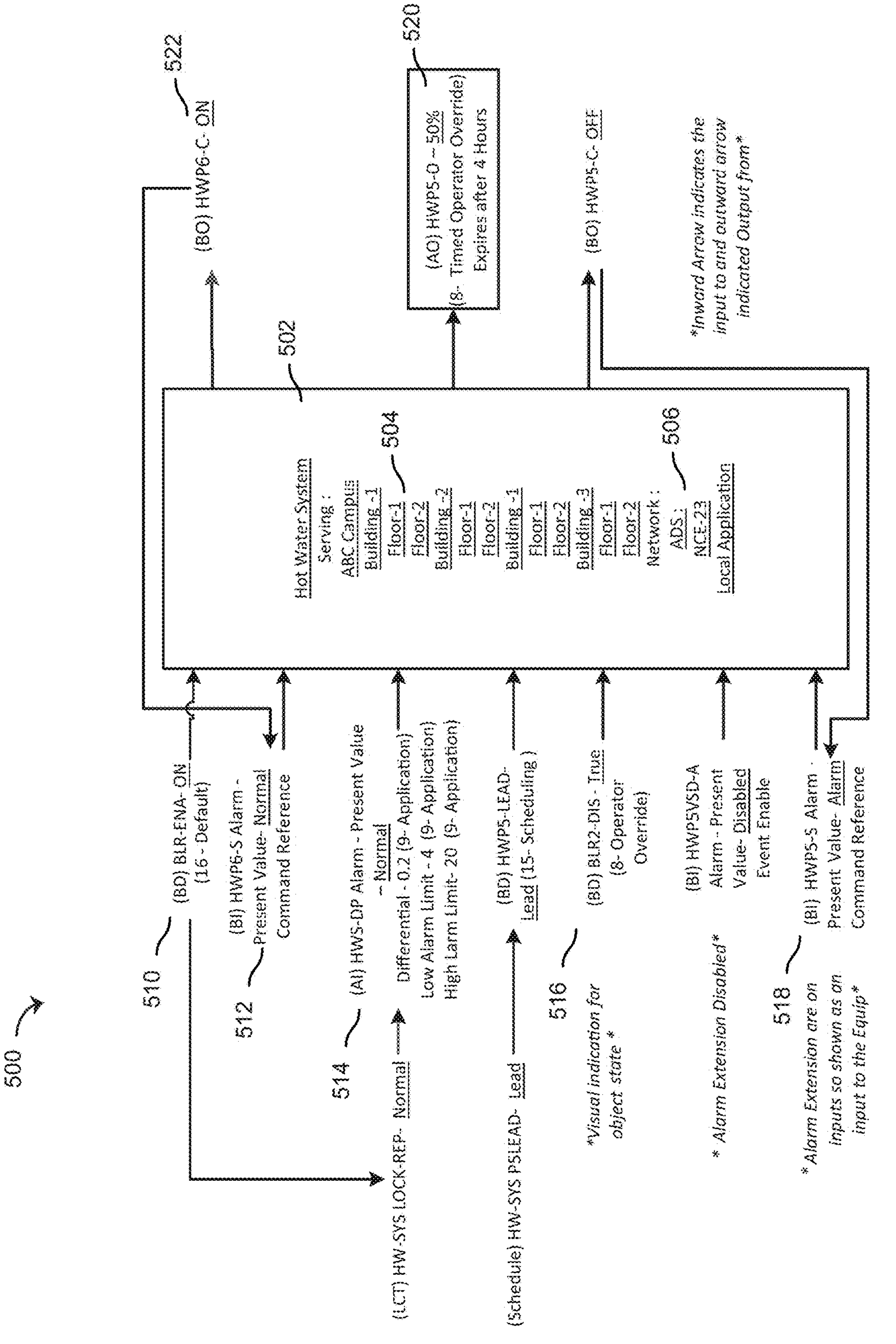
FIG. 5 is an example user interface for a hot water system that can be generated by the user interface system of FIG. 2, according to some embodiments.
Figure 6:
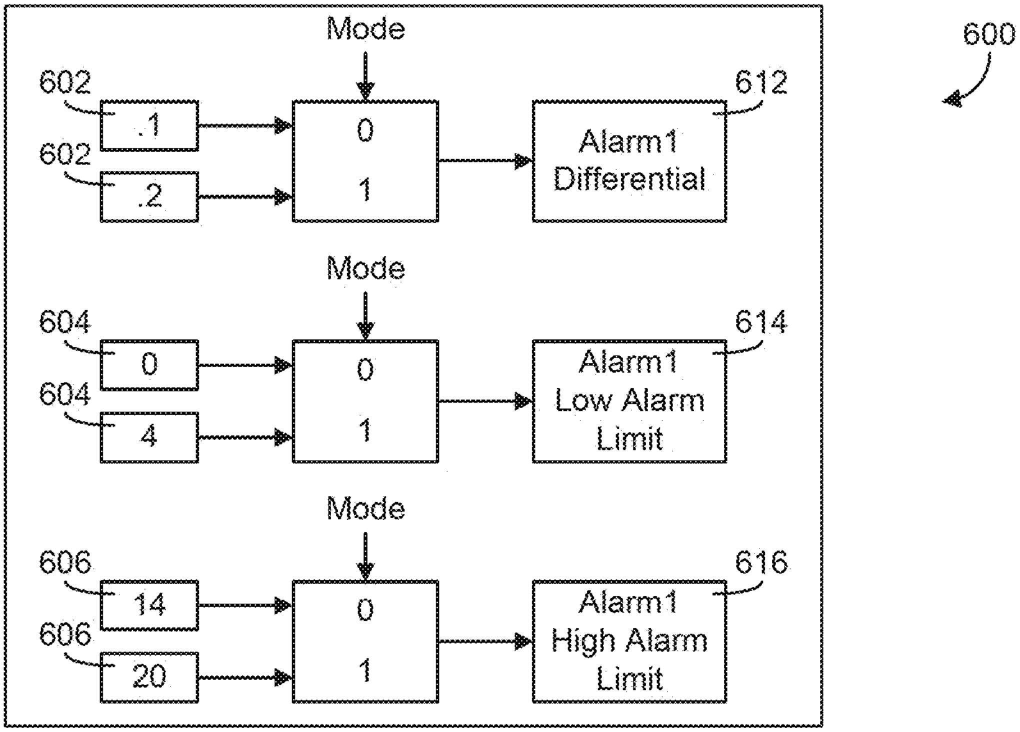
FIG. 6 is an example user interface displaying a logic connector tool for the hot water system of FIG. 5, according to some embodiments.
Figure 7:
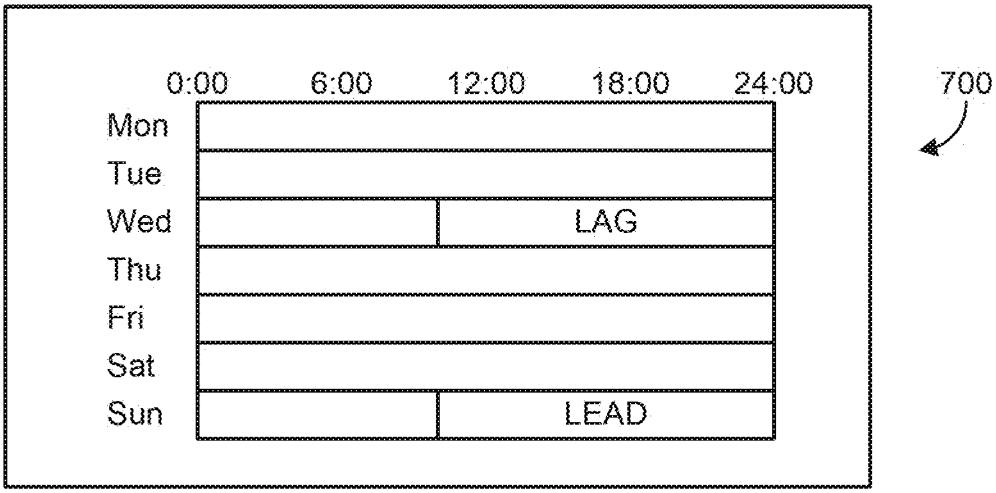
FIG. 7 is an example user interface displaying scheduling information for the hot water system of FIG. 5, according to some embodiments.

Referring generally to FIGS. 5-7, example interactive user interfaces that can be generated by display module 226 and provided to a user device 204 are shown in greater detail. Referring to FIG. 5, a user interface 500 is shown that may be generated for a hot water system. In the example of FIG. 5, the object selected by the user is the hot water system, and all components related to the hot water heater are illustrated on user interface 500.

Object 502 representing the hot water system is shown to display a list of spaces served by the hot water system. Object 502 may identify multiple spaces 504. Object 502 may further identify multiple networks 506, i.e., one or more networks to which the hot water system is connected. Each individual space 504 and network 506 are shown to be selectable via link. Upon selection of a space or network, user interface 500 may be configured to create an object for the space or network and to display all components affected by the space or network. This allows the user to navigate from component to component via user interface 500.

User interface 500 further illustrates various components (e.g., equipment, setpoints, etc.) that impact the performance of the hot water system. For example, a boiler 510 of the hot water system is shown as enabled (BLR-ENA) with a low priority level (16). Boiler 510 is an example of a piece of equipment associated with the hot water system. A hot water pump status 512 (HWP6-S) is shown, with an alarm generated based on a current value 522. A hot water supply differential pressure (HWS-DP) value 514 is shown, also with an alarm generated based on the current value. Status 512 and value 514 are example values of current conditions that the hot water system may be responsible for maintaining or monitoring.

Further, a boiler discharge value 516 (BLR2-DIS) is shown as true. In this example, an operator has provided an override value to BMS 100 based on the status of the boiler. User interface 500 may indicate that the operator has provided the override value, and that the override value has an impact on the status of the hot water system.

Further, a second hot water pump status 518 is shown (HWP5-S), with an alarm generated based on a current value. User interface 500 may highlight object 518 on the screen to further illustrate its impact on the hot water heater. User interface 500 may be configured to highlight each object on the screen in various ways (e.g., via shading, coloring, different line weights or dashes, different shapes, different text, etc.).

In the embodiment of FIG. 5, a user may edit the value or setpoint associated with any of the displayed object. For example, the user may choose to ignore a current alarm status of object 512. When the user provides such an indication, user interface 500 may be configured to update to show the impact of the alarm on the hot water system, and on the other components (objects) associated with the hot water system. Further, if the user changes any value, user interface 500 may update appropriately.

User interface 500 further illustrates an output 520 of the hot water system (HWP5-O). As the user modifies a value, setting, or control strategy, user interface 500 may update to show an updated output 520, allowing the user to see how a change in one component impacts an output of the hot water system.

Referring to FIG. 6, a logic connector tool (LCT) 600 for the hot water system of FIG. 5 is shown. LCT 600 is an example user interface that can be provided via the systems and methods described herein. LCT 600 may generally be used to connect current data and values in a BMS component with logic or decisions blocks that impact the control strategy for a BMS system (e.g., one or more systems or subsystems within BMS 100). In other words, using LCT 600, a user may configure a control strategy for a BMS system and see the impact of current data and values on the control strategy. In the embodiment of FIG. 6, data 602 representative of a differential between two data points of the hot water system are chosen by the user, and a differential alarm 612 may be activated if the values reach a threshold. Similarly, data 604 and 606 may be specified by a user to correspond with a low alarm limit 614 and high alarm limit 616. When specifying the values to use, or changing the values, the user may be able to see when an alarm is activated, and the impact of the alarm on the performance of the hot water system.

Referring to FIG. 7, a schedule interface 700 for the hot water system of FIG. 5 is shown. As described above, the user may access schedule information for an equipment, space, or system. The schedule may indicate a control strategy over time for the equipment, space, or system. The user, via schedule interface 700, may be able to select a specific time or interval and may be provided with information about the impact of the control strategy at the time or interval. More specifically, the user may be able to view the impact on related equipment and spaces over time. The user may further be able to adjust a schedule (e.g., changing a setpoint for a given period of time), and to see the impact of the change on related equipment and spaces.

Figure 8:
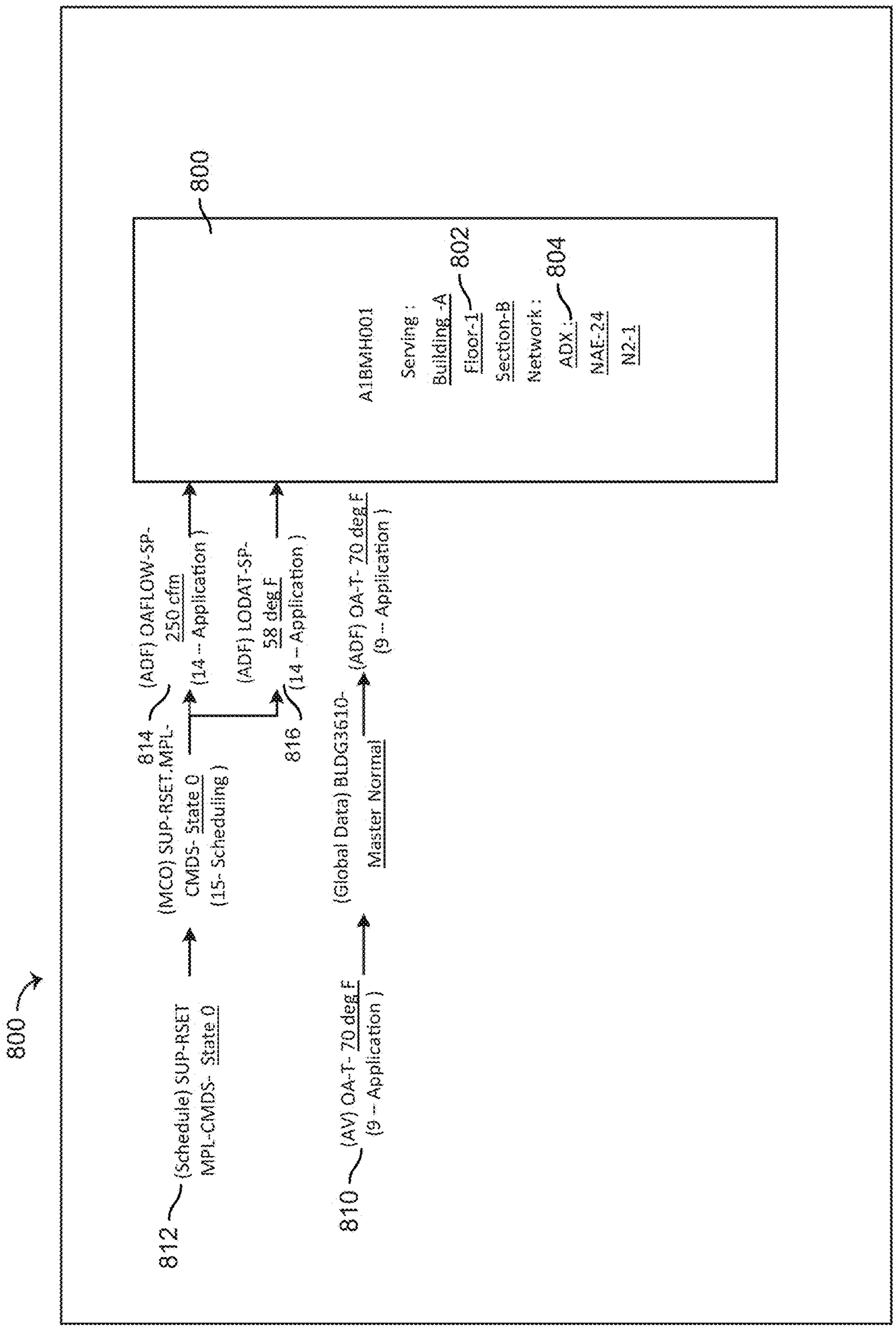
FIG. 8 is an example user interface for an air handling unit that can be generated by the user interface system of FIG. 2, according to some embodiments.

Referring now to FIG. 8, an example user interface 800 is shown. In the example of FIG. 8, the user has chosen an AHU, shown as object 802. Multiple spaces 804 whose environment is affected by the AHU are shown listed in object 802, along with multiple networks 806 connected to the unit. Similarly to FIG. 5, the user may be able to select a space to cause the user interface to generate a view with the selected space as the object.

As the AHU is a piece of equipment, data may be retrieved for display on user interface 800 that may impact the performance or operation of the AHU. For example, outside air temperature 810 (OA-T) is shown as an identified data point relevant to the AHU. The outside air temperature may generally impact the control strategy for the AHU, as the temperature may impact the decision on whether the AHU needs to provide cooled or heated air to a building area. Outside air temperature 810 (shown as 70°) is shown associated with a building area (BLDG3610).

As shown in FIG. 8, a supervisory controller reset function 812 (SUP-RSET) is identified as impacting the AHU. Function 812 may be a function, for example, entered by a user, and user interface 800 in response may display an impact of the function on the AHU operation. Function 812 may cause the supervisory controller to reset based on a schedule. The reset may cause a change in status of the AHU. For example, an outside air flow amount 814 is identified (250 cubic feet per minute, or cfm), along with the temperature 816 of the air flow (58°). This outside air flow 814 may occur at the time of reset of the controller, impacting the performance of the AHU. When user interface 800 is loaded for the user and the reset function 812 is selected by the user, user interface 800 is configured to show the data, values, and setpoints impacted by the function, along with the eventual impact on the AHU.

Figure 9:
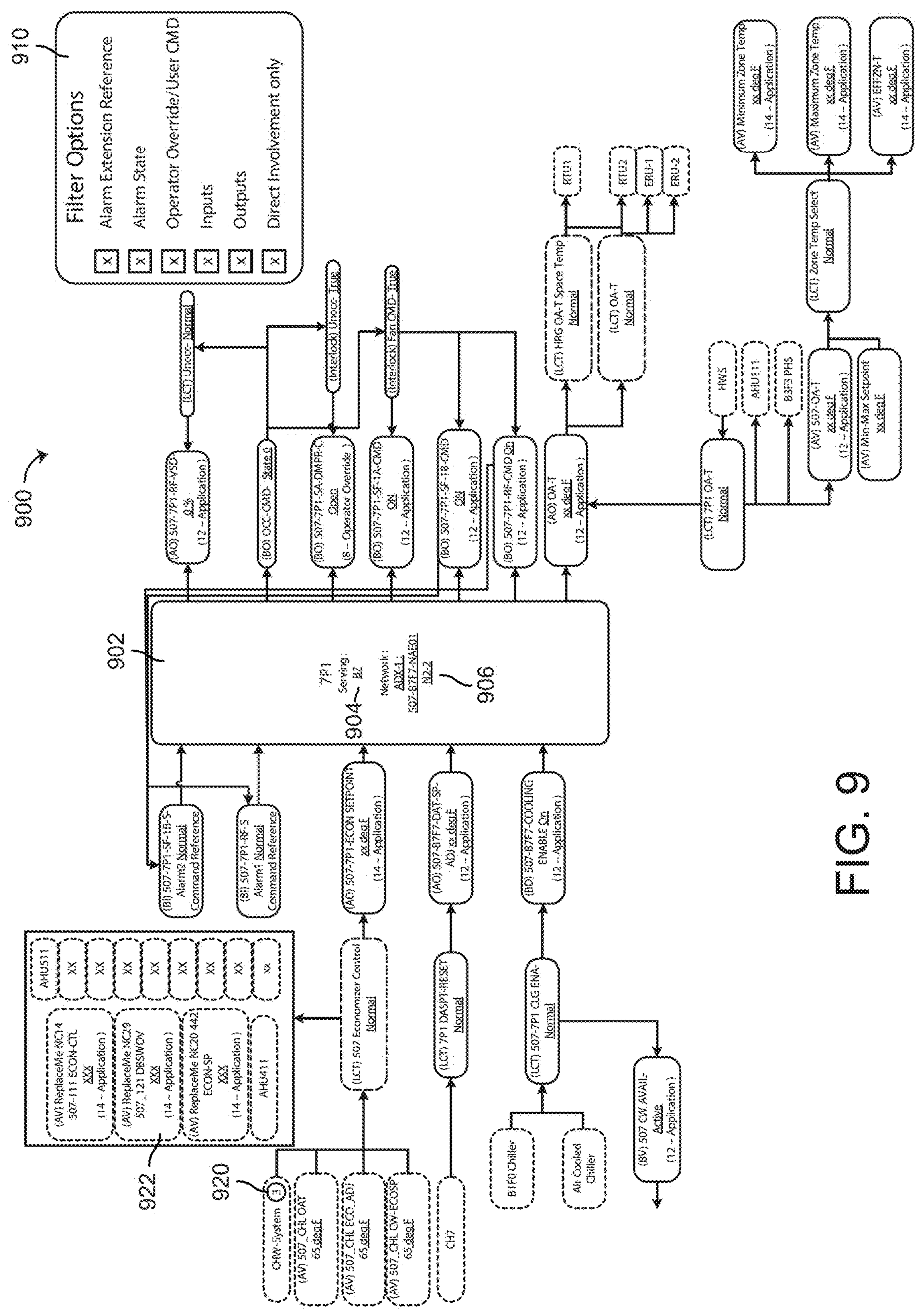
FIG. 9 is another example user interface for an air handling unit that can be generated by the user interface system of FIG. 2, according to some embodiments.

Referring to FIG. 9, another example user interface 900 is shown for the AHU example. As described above, while navigating a user interface generated for a first object, the user may select a second object. Upon selection of the second object, the user interface may be updated or changed to feature the second object. In some embodiments, the user interface is updated to include only objects associated with the second object. In some embodiments, the user interface is update to include object associated with either the first object or second object. In the example of FIG. 9, the user may have started out viewing information for a network automation engine (NAE) (507-B7F7-NAE01, shown in object 902), then clicked on an equipment (N2-2, also shown in object 902). The user may have then clicked on a AHU object (shown as 7P1 in object 902). As a result, all objects related to the NAE and equipment are shown in user interface 900 in addition to the AHU.

Referring further to FIG. 9, a filter option 910 is shown in greater detail. In some embodiments, the user may be able to filter objects shown in a user interface, such that only objects featuring a certain criteria are displayed. As shown in FIG. 9, the user may choose whether or not to display objects related to an alarm extension reference, to an alarm state, or an operator override or user command, to inputs or outputs, or to only display objects with direct involvement with the AHU. For example, by de-selecting the inputs and outputs options, the user may remove all information related to inputs received at the AHU and outputs provided by the AHU to other systems, allowing the user to just view equipment. As another example, by selecting only the alarm options, the user may be able to easily view all alarms generated as a result of operation of the AHU. As another example, by only selecting the user command option, the user may more clearly see his or her options for changing the operation of the AHU.

As described with reference to FIGS. 5 and 8, object 902 is shown to include a list 904 of building spaces the object serves (B7) and a list 906 of network information of objects connected to object 902. List 906 is shown in top-down order, from the server (ADX-1), to the NAE, to the trunk (N2-2).

Some objects may be highlighted (922) in user interface 900. This is illustrated in FIG. 9 as a dashed line for the boxes, but the highlighting may include any change in color, shading, font size or color, or the like. In some embodiments, such as that shown in FIG. 9, highlighted objects may indicate a system component (e.g., a piece of equipment). In some embodiments, an indication of a number of references from a system, shown as 922, may be included in an object. In the example of FIG. 9, the reference 3 indicates that there are three components of the chiller system connected to the AHU object 902.

Figure 10:
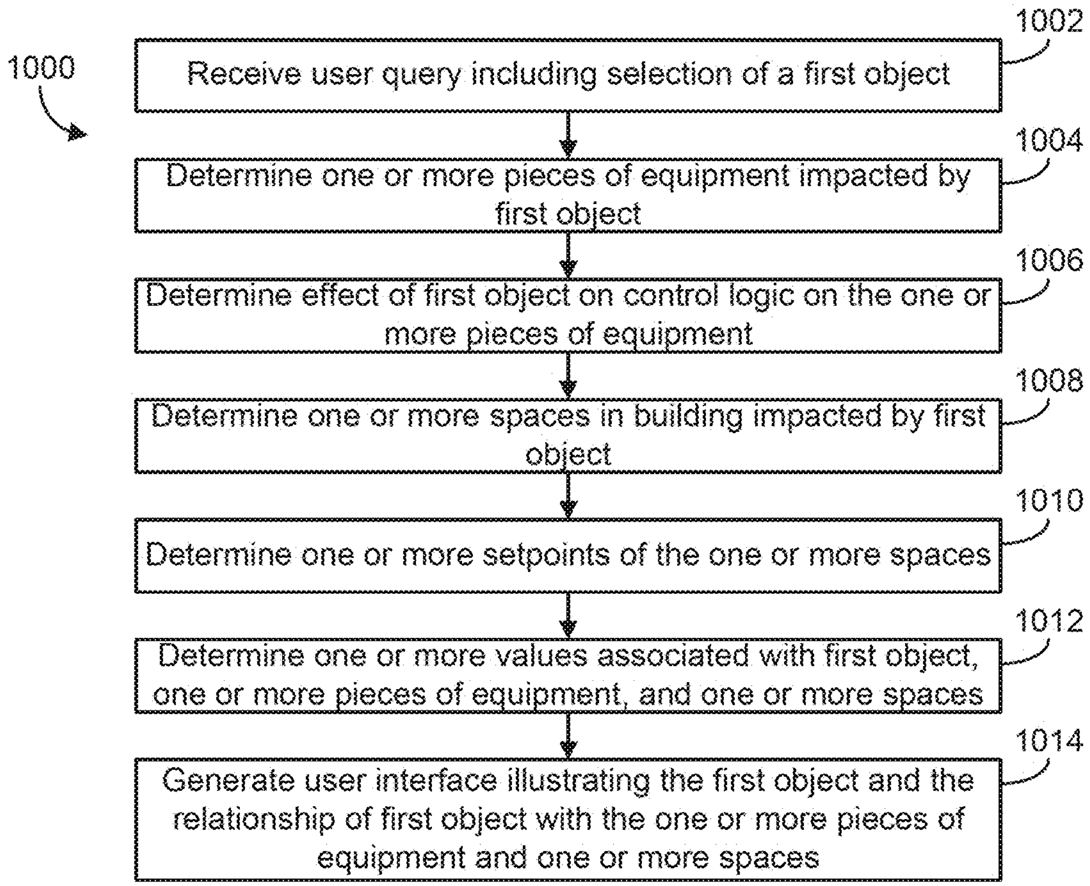
FIG. 10 is a flow chart of a process which can be performed by the BMS controller of FIG. 1 for generating an interactive user interface for a BMS, according to some embodiments.

Referring now to FIG. 10, a flow chart of a process 1000 for generating an interactive user interface to be displayed on a user device is shown, according to some embodiments. Process 1000 may be executed by, for example, user interface system 202. The user interface to be displayed on the user device may be configured to allow for the monitoring and controlling of building equipment and spaces in a BMS (e.g., BMS 100), and more particularly for viewing the impact of a component of the BMS on other components of the BMS.

Process 1000 includes receiving a user query including the selection of a first object (1002). The first object may be associated with one of a building system, a piece of equipment, or a space in the building. The selection may be an indication from a user that the user wishes to view the relationship between the object and other objects in a BMS.

Process 1000 includes determining one or more pieces of equipment impacted by the first object (1004). For example, if the first object represents a building space, 1004 may include identifying all equipment in the building space. If the first object represents a building subsystem, 1004 may include identifying all equipment part of the subsystem. If the first object represents a piece of equipment, 1004 may include identifying all equipment connected to the identified equipment.

Process 1000 includes determining an effect of the first object on control logic on the one or more pieces of equipment (1006). As described in the present disclosure, the subsystems and equipment of the BMS may be controlled by a high level control logic. 1006 may include identifying potential changes to the high level control logic to account for the behavior of the first object.

Process 1000 includes determining one or more building spaces impacted by the first object (1008). Process 1000 includes determining one or more setpoints of the one or more spaces (1010). The setpoints may include, for example, a condition that a piece of equipment or subsystem is supposed to maintain. For example, a setpoint may include a temperature setpoint for the space, lighting levels for the space, and the like.

Process 1000 includes determining one or more values associated with the first object, one or more pieces of equipment, and one or more spaces (1012). Values may include, for example, a current status of a piece of equipment or space, current environmental conditions in a space, a warning status for a piece of equipment or space, or parameters for the operation of a piece of equipment. The values may include "real-time" values of the current environment, or current settings associated with an equipment or space.

Process 1000 includes generating a user interface illustrating the first object and its relationship with the one or more equipment and spaces (1014). The relationship may be illustrated using, for example, by defining a control path between the equipment and spaces. Each equipment and space may be represented by an object in the user interface. The object may be a link, icon, button, or any other feature on the user interface that may be interacted with by a user. The user interface may further include the values determined at 1012. For example, values associated with a particular object may be displayed next to the object, allowing the user to view an impact of the first object on the values.

In some embodiments, the query received at 1002 may include a change in operation of the first object, or a change in a setpoint or value associated with the first object. The subsequent portions of process 1000 may then further include determining an effect in control logic and setpoints that the change has.

In some implementations, the user may be provided with a schedule via the user interface. The schedule may relate to the implementation of control logic for a piece of equipment, or a schedule of setpoints for a building area. The user may be able to view adjustments in the schedule based on the impact that the first object has on the schedule.

Involvement Features

According to the exemplary embodiment shown in FIGS. 11-16, the BMS 100 and/or the user interface system 202 are configured to facilitate providing an additional graphical user interface, shown as involvement GUI 1100. As shown in FIGS. 11-16, the involvement GUI 1100 displays a first section, shown as network tree section 1110, and a second section, shown as involvement section 1120. The network tree section 1110 provides a network overview, shown as network tree 1112, having a plurality of selectable objects, shown as objects 1114, representing items or components (e.g., a piece of equipment, a building area, a subsystem, etc.) associated with or included in the BMS 100.

As shown in FIGS. 11-16, the involvement section 1120 provides a relationship and involvement graphic, shown as involvement map 1122. The arrangement and items/objects included in the involvement map 1122 may be based on a user selection (e.g., a user selection of one of the objects 1114 included in the network tree 1112). The involvement map 1122 includes a first section, shown as selected object section 1130, a second section, shown as upstream object section 1140, and a third section, shown as downstream object section 1150.

The selected object section 1130 includes a first object indicia or box, shown as selected object box 1132, that is displayed by the BMS 100 and/or the user interface system 202 in the involvement map 1122 based on the user selection of an object of interest (e.g., a respective object 1114 in the network tree 1112). The selected object box 1132 represents an item or component (e.g., a piece of equipment, a building area, a subsystem, etc.) associated with or included in the BMS 100. The selected object box 1132 is then used by the BMS 100 and/or the user interface system 202 as the basis for relationships and involvements determined, acquired, and/or generated by the BMS 100 and/or the user interface system 202 and displayed through the remainder of the involvement map 1122. For example, the relationships and involvements of the item or component represented by the selected object box 1132 may be read from the item or component associated with the BMS 100, the respective object 1114 selected, and/or the selected object box 1132 (e.g., based on a user configuration of the item or component associated with the selected object box 1132, based on a user configuration of the respective object 1114, based on a user configuration of the selected object box 1132) and displayed to a user via the involvement map 1122.

After selection of a respective object associated with an item or component associated with the BMS 100 (e.g., through the network tree 1112) and displaying the selected object box 1132 associated therewith, the BMS 100 and/or the user interface system 202 are configured to acquire the relationships and involvements associated with the item, component, or object represented by the selected object box 1132 and populate the upstream object section 1140 and the downstream object section 1150 accordingly. Specifically, as shown in FIGS. 11-16, the BMS 100 and/or the user interface system 202 are configured to (i) populate the upstream object section 1140 with one or more second object indicia or boxes, shown as upstream object boxes 1142, and/or (ii) populate the downstream object section 1150 with one or more third object indicia or boxes, shown as downstream object boxes 1152, based on the selected object box 1132 (or the respective object 1114 or the item/component associated therewith).

The upstream object boxes 1142 represent respective objects (e.g., from the network tree 1112, the objects 1114, which represent items or components associated with or included in the BMS 100, etc.) that have some sort of upstream relationship and/or involvement with the selected object box 1132 (or the respective object 1114 or the item/component associated therewith). In some embodiments, an upstream relationship and/or involvement with the selected object box 1132 indicates that the building objects represented by the upstream object boxes 1142 are located physically or logically "upstream" of the building object represented by the selected object box 1132 in the BMS 100. Upstream building objects represented by the upstream object boxes 1142 may operate in a manner that affects the building object represented by the selected object box 1132. For example, if the building object represented by the selected object box 1132 is a VAV unit or building space, an upstream controller or AHU represented by the upstream object boxes 1142 may operate in a manner that controls operation of the VAV unit represented by the selected object box 1132 or affects a temperature or humidity of the building space represented by the selected object box 1132. Upstream building objects represented by the upstream object boxes 1142 may be include building objects that are referenced by the building object represented by the selected object box 1132. For example, the building object represented by the selected object box 1132 may reference one or more attributes of the upstream building objects represented by the upstream object boxes 1142 such that one or more attributes of the building object represented by the selected object box 1132 are logically dependent upon one or more attributes of the upstream building objects represented by the upstream object boxes 1142.

The downstream object boxes 1152 represent respective objects (e.g., from the network tree 1112, the objects 1114, which represent items or components associated with or included in the BMS 100, etc.) that have some sort of downstream relationship and/or involvement with the selected object box 1132 (or the respective object 1114 or the item/component associated therewith). In some embodiments, a downstream relationship and/or involvement with the selected object box 1132 indicates that the building objects represented by the downstream object boxes 1152 are located physically or logically "downstream" of the building object represented by the selected object box 1132 in the BMS 100. Downstream building objects represented by the downstream object boxes 1152 may be affected by operation of the building object represented by the selected object box 1132. For example, if the building object represented by the selected object box 1132 is a controller or AHU, a downstream VAV unit or building space represented by the downstream object boxes 1152 may be controlled by the controller represented by the selected object box 1132 or the temperature or humidity of the building space may be affected by operation of the AHU represented by the selected object box 1132. Downstream building objects represented by the upstream object boxes 1152 may be include building objects that reference the building object represented by the selected object box 1132. For example, the building object represented by the selected object box 1132 may include one or more attributes that are referenced by the downstream building objects represented by the downstream object boxes 1152 such that one or more attributes of the building objects represented by the downstream object boxes 1152 are logically dependent upon one or more attributes of the building object represented by the selected object box 1132.

As shown in FIGS. 11-16, the BMS 100 and/or the user interface system 202 are configured to connect the upstream object boxes 1142 with the selected object box 1132 using first connectors, shown as upstream relationship lines 1144, and connect the downstream object boxes 1152 with the selected object box 1132 using second connectors, shown as downstream relationship lines 1154. According to the exemplary embodiment shown in FIGS. 11-16, (i) the upstream relationship lines 1144 terminate with an arrow head at the selected object box 1132 showing a single direction relationship flowing from the upstream object boxes 1142 to the selected object box 1132 and (ii) the downstream relationship lines 1154 terminate with an arrow head at the downstream object boxes 1152 showing a single direction relationship flowing from the selected object box 1132 to the downstream object boxes 1152. In some instances, a bi-directional relationship may be present between (i) one or more of the upstream object boxes 1142 and the selected object box 1132 and/or (ii) one or more of the downstream object boxes 1152 and the selected object box 1132. In some embodiments, the upstream relationship line(s) 1144 and/or the downstream relationship line(s) 1154 associated with such bi-directional relationship(s) terminate with an arrow head at both ends to represent such a bi-directional relationship. In other embodiments, even if a bi-directional relationship exists, only the single direction relationship is displayed like shown in FIGS. 11-16. However, in such embodiments, the other direction of the relationship may be displayed when the corresponding object on the end the relationship line without the arrow head is selected for display in the selected object box 1132.

As shown in FIGS. 11-16, the BMS 100 and/or the user interface system 202 are configured to further visually define the relationships between the selected object box 1132, the upstream object boxes 1142, and the downstream object boxes 1152 by displaying one of a plurality of types of involvement modifiers or involvement types for each of the relationships along the connector lines associated therewith. The plurality of types of involvement modifiers includes a first type of involvement, shown as "referenced by" involvement 1160, a second type of involvement, shown as "controls" involvement 1162, and a third type of involvement, shown as "unbound" involvement 1168. The "controls" involvement 1162 includes two sub-types of involvements including a first sub-type of involvement, shown as "write(s)" involvement 1164, and a second sub-type of involvement, shown as "command(s)" involvement 1166.

Figure 11:
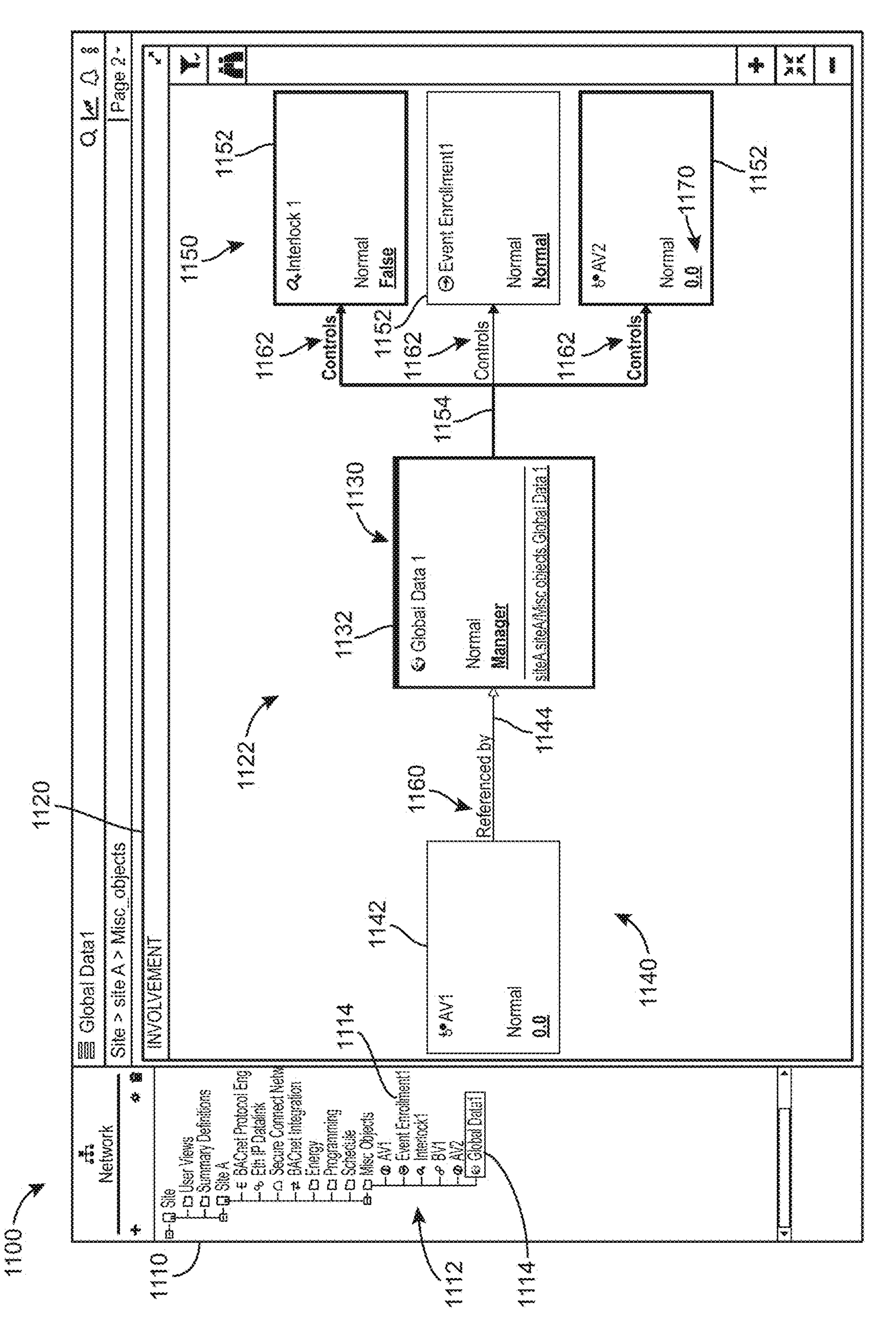
FIGS. 11-16 show various examples of a user interface including involvement features that display relationships and involvements between objects representing items or components associated with a BMS, according to some embodiments.

The "referenced by" involvement 1160 indicates that the selected object box 1132 is involved with a respective upstream object box 1142 or a respective downstream object box 1152 through a referential relationship/involvement where one object associated with one of the two boxes involved in the relationship (i.e., connected by a respective upstream relationship line 1144, connected by a respective downstream relationship line 1154) references the other object associated with the other one of the two boxes involved in the relationship. As an example, as shown in FIG. 11, the object "Global Data1" of the selected object box 1132 references the object "AV1" of the upstream object box 1142.

The "controls" involvement 1162 indicates that the selected object box 1132 is involved with a respective upstream object box 1142 or a respective downstream object box 1152 through a controls relationship where one object associated with one of the two boxes involved in the relationship (i.e., connected by a respective upstream relationship line 1144, connected by a respective downstream relationship line 1154) controls the other object associated with the other one of the two boxes involved in the relationship is some way (e.g., a write control, a command control, etc.). As an example, as shown in FIG. 11, the object "Global Data1" of the selected object box 1132 controls the objects "Interlock1," "Event Enrollment1," and "AV2" of the downstream object boxes 1152.

Figure 12:
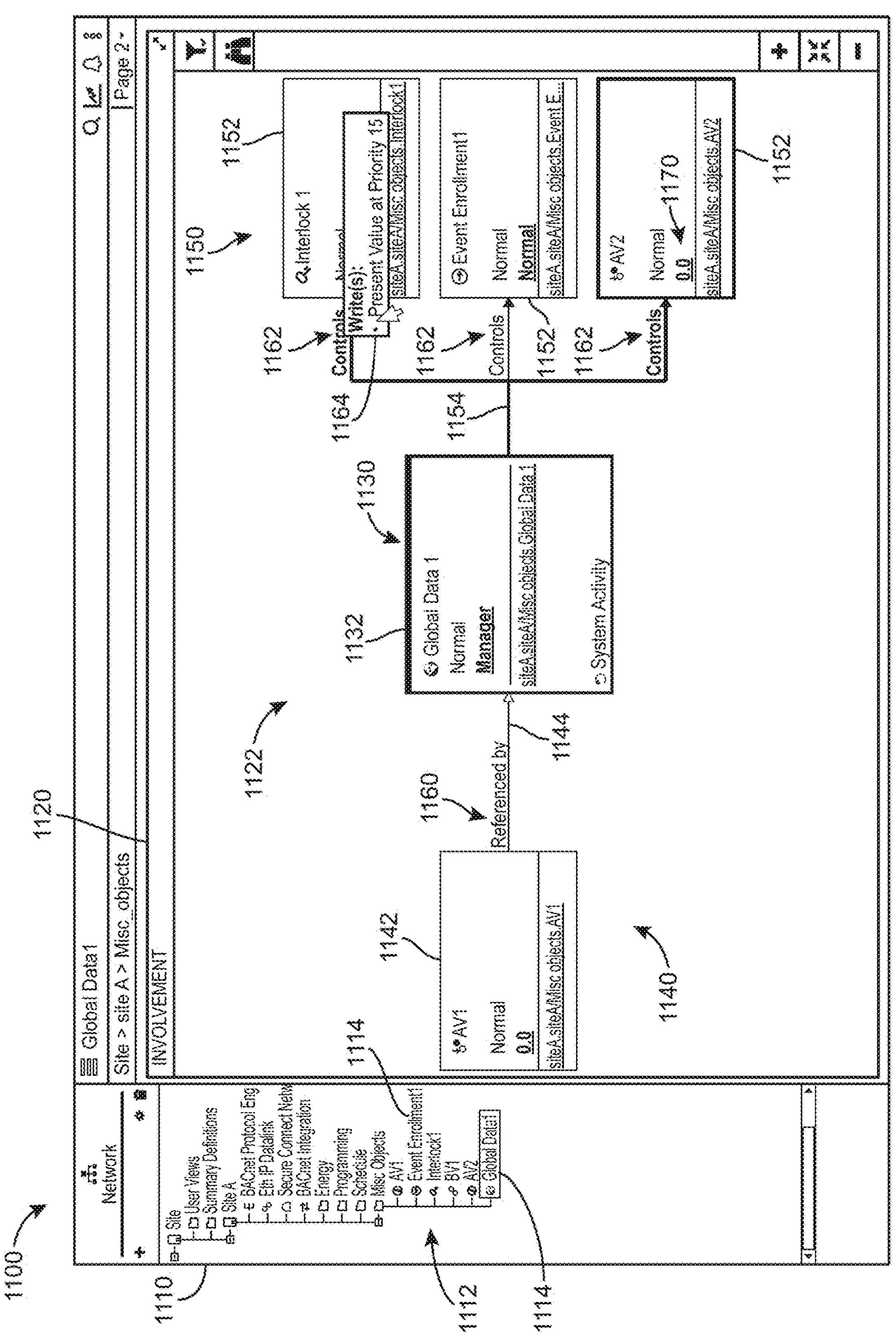
Figure 13:
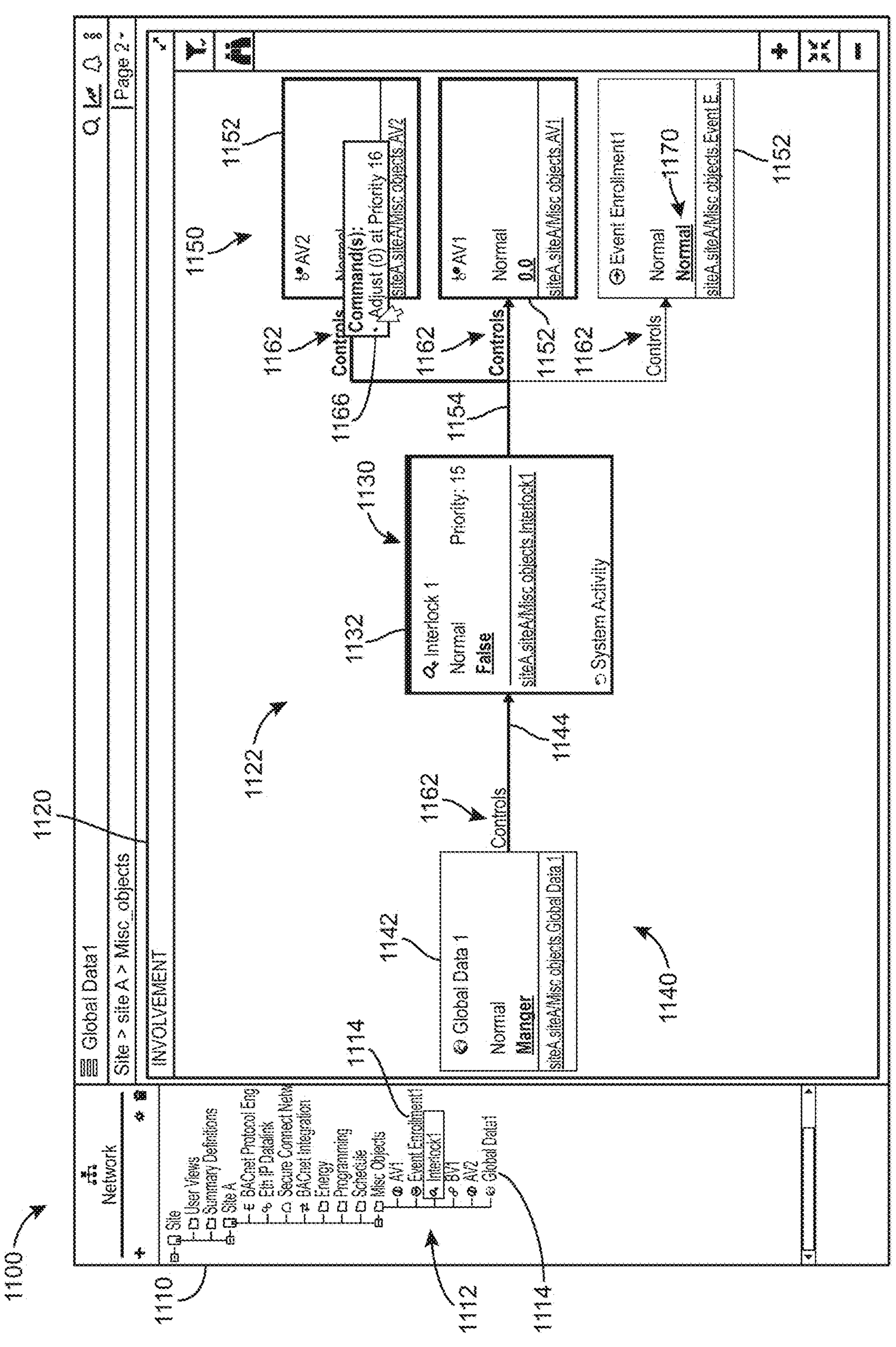

As shown in FIGS. 12 and 13, the sub-type of involvement for the "controls" involvement 1162 is selectively displayed by the BMS 100 and/or the user interface system 202 (e.g., when a user hovers over or selects a respective "controls" involvement 1162 with a cursor, via touch on a touch interface, etc.). The "write(s)" involvement 1164 indicates that the selected object box 1132 is involved with a respective upstream object box 1142 or a respective downstream object box 1152 through a write-control relationship where one object associated with one of the two boxes involved in the relationship (i.e., connected by a respective upstream relationship line 1144, connected by a respective downstream relationship line 1154) writes one or more values, setpoints, priorities, etc. to the other object associated with the other one of the two boxes involved in the relationship. As an example, as shown in FIG. 12, the object "Global Data1" of the selected object box 1132 writes to the object "Interlock1" of one of the downstream object boxes 1152. The "command(s)" involvement 1166 indicates that the selected object box 1132 is involved with a respective upstream object box 1142 or a respective downstream object box 1152 through a command-control relationship where one object associated with one of the two boxes involved in the relationship (i.e., connected by a respective upstream relationship line 1144, connected by a respective downstream relationship line 1154) commands (e.g., adjusts, etc.) the other object associated with the other one of the two boxes involved in the relationship. As an example, as shown in FIG. 13, the object "Interlock1" of the selected object box 1132 commands the object "AV2" of one of the downstream object boxes 1152.

Figure 14:
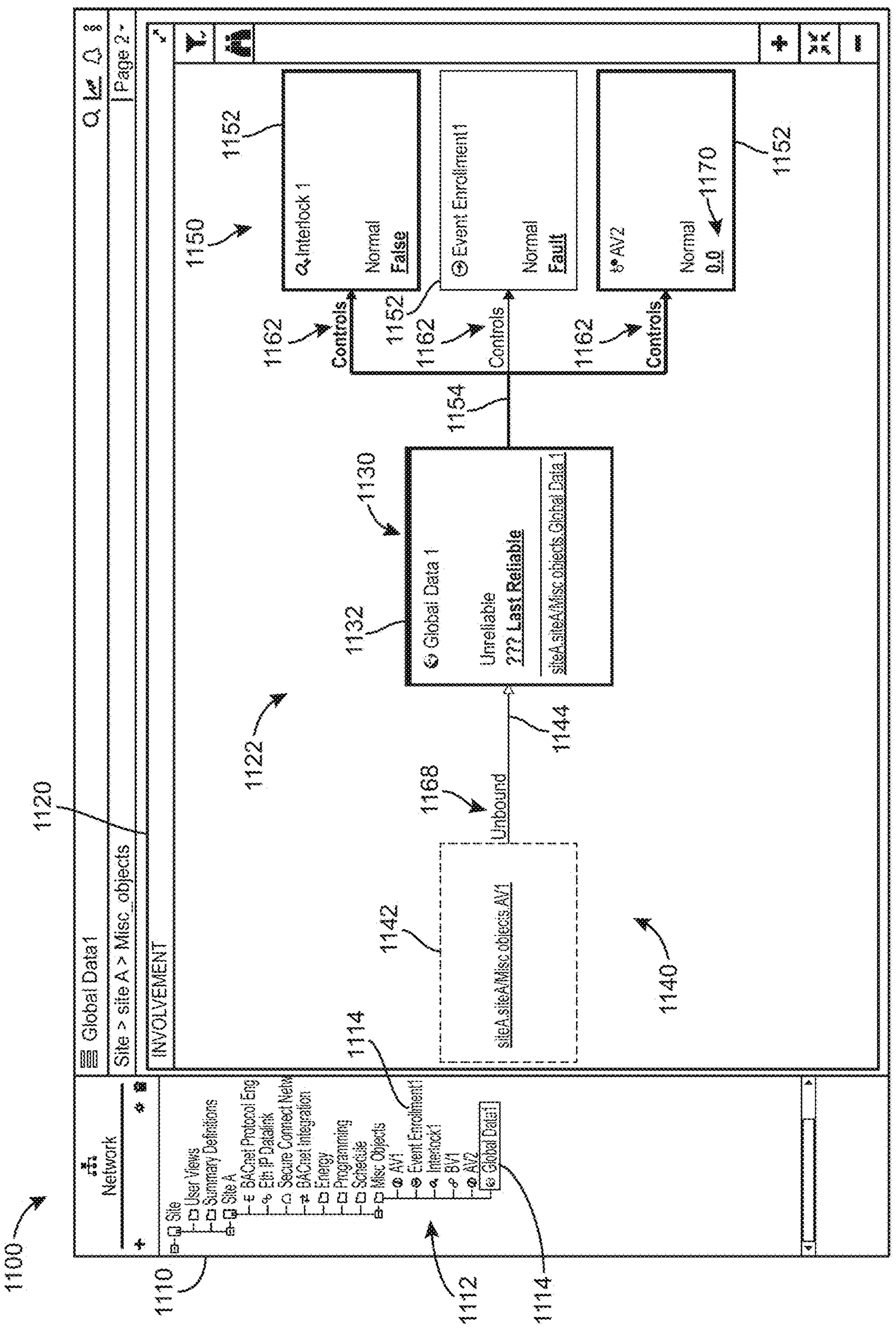

The "unbound" involvement 1168 indicates that the selected object box 1132 was previously involved with a respective upstream object box 1142 or a respective downstream object box 1152 (e.g., through a "referenced by" involvement 1160, through a "controls" involvement 1162, etc.), but such involvement or relationship has been severed or otherwise removed (e.g., intentionally, unintentionally, etc.). As an example, as shown in FIG. 14, the object "Global Data1" of the selected object box 1132 and the object "AV1" of the upstream object box 1142 are unbound meaning the "referenced by" involvement 1160 previously set (see, e.g., FIGS. 11 and 12) has been removed and no relationship and/or involvement currently exists. In such an instance, rather than removing the upstream object box 1142 from the involvement map 1122, instead, the BMS 100 and/or the user interface system 202 are configured to highlight or otherwise indicate the "unbound" involvement 1168 (e.g., by changing the appearance of the upstream object box 1142, changing the box from solid to dashed, changing the color of the box, etc.) to a user. The user can then, therefore, easily detect when an unbound relationship is created and easily re-institute or revert back to the previous relationship and involvement (if the unbounding was unintentional or not meant to be permanent), or choose to permanently delete the relationship, at which point the unbound box would be removed from the involvement map 1122.

While the involvement types described herein have been referred to as being either a "referenced by" involvement, a "controls" involvement, or an "unbound" involvement, it should be understood that other types of involvements may exist or be implemented to provide and define different types of relationships between the objects of the involvement map 1122.

Figure 15:
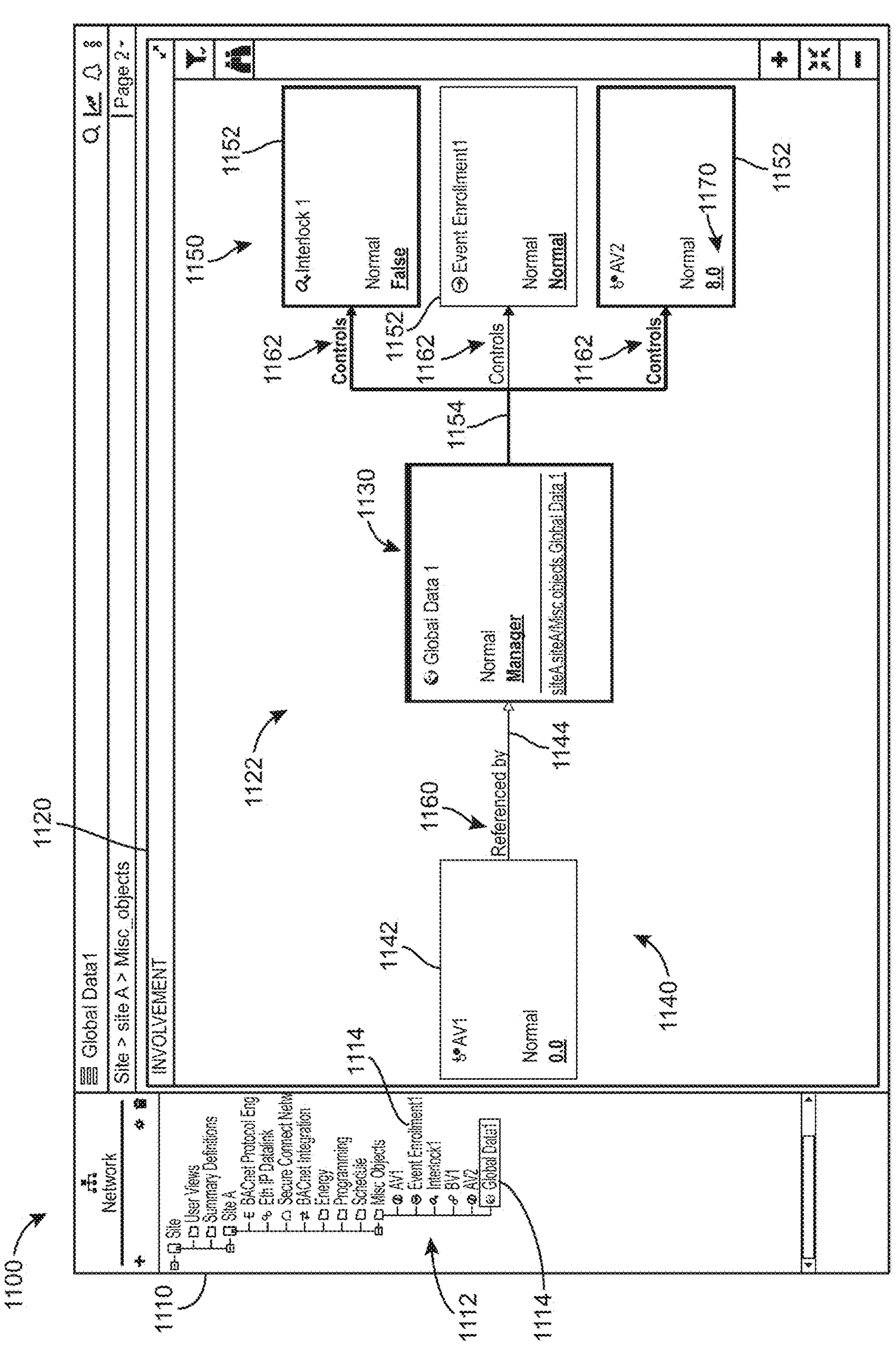

As shown in FIGS. 11 and 12 versus FIG. 13, when selecting a different object for the selected object box 1132, different involvement maps 1122 are generated in response to and based on the specific object selected (e.g., from the network tree 1112). As shown in FIGS. 11-16, the various boxes include a display of data (e.g., parameters, setpoints, values, operating states, etc.), shown as data 1170. As shown in FIGS. 14 and 15, the data 1170 can be dynamically updated in real-time.

Figure 16:
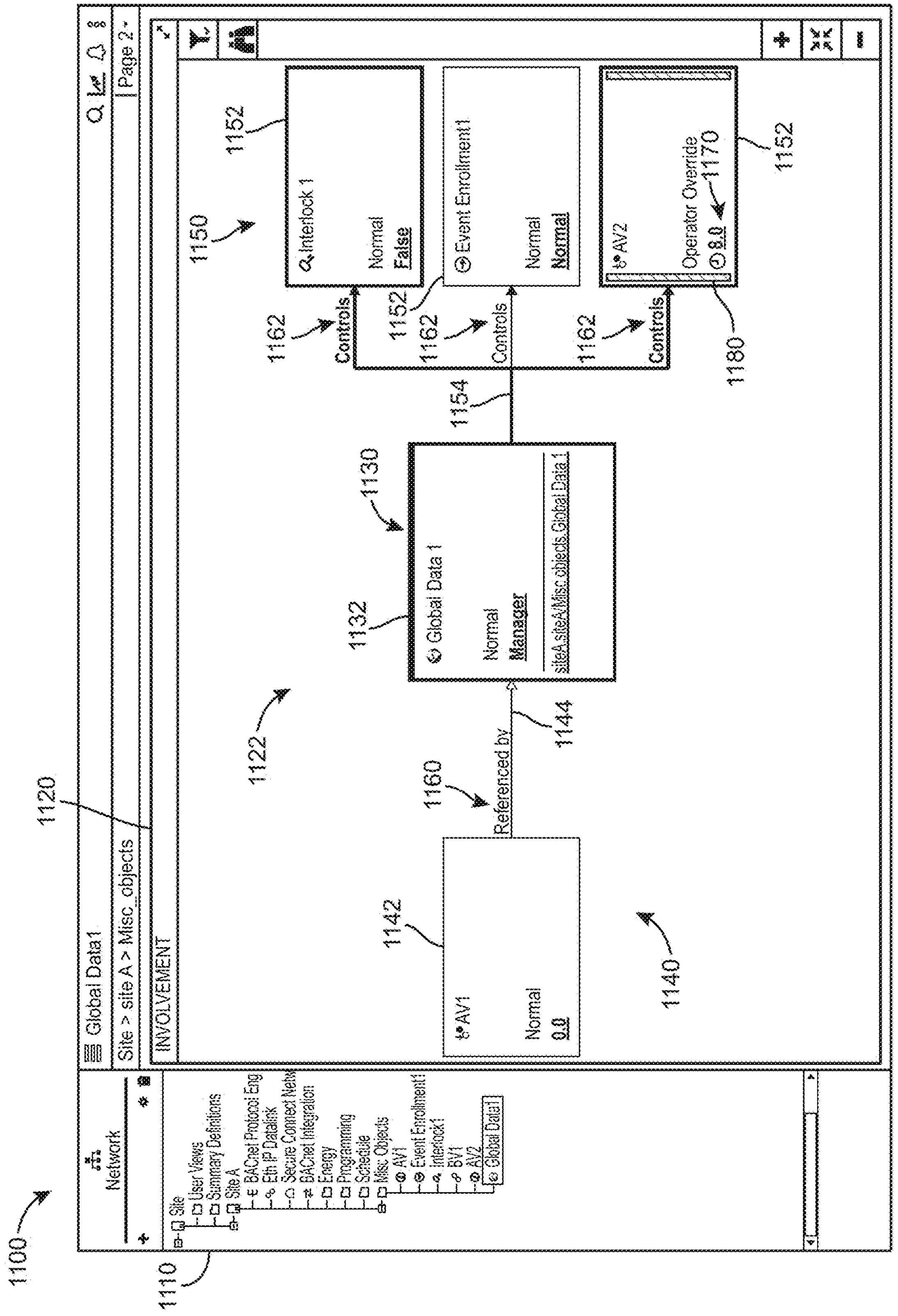

As shown in FIG. 16, the BMS 100 and/or the user interface system 202 are configured to provide notifications, shown as notifications 1180, within the boxes of the involvement map 1122. According to the exemplary embodiment shown in FIG. 16, the notifications 1180 include two bars extending along the lateral sides or ends of a respective box. In other embodiments, the notifications 1180 include two bars extending along the upper and lower sides or ends of a respective box. The bars of the notification 1180 may have varying appearances or characteristics such as a variety of colors (e.g., green, yellow, orange, red, etc.), flash/blink, etc. to provide various information or indications (e.g., type of notification, severity of notification, etc.) to the user. In other embodiments, the notifications 1180 are otherwise provided with different appearances or characteristics (e.g., by highlighting the entire box a certain color; by flashing the entire box; by changing the line around the box to be bold, dashed, dotted, dash-dot, double line, etc.). The notifications 1180 may provide information directly to the user (e.g., based on prior knowledge of the different types of notifications) or a user may be able to hover over or click on the notification 1180 to be provided additional information. The notifications 1180 may provide a variety of information such as, for example, failure conditions, operator override conditions, operational limits being exceeded, etc.

In some embodiments, the BMS 100 and/or the user interface system 202 are configured to obtain or generate various information associated with each of the building objects represented by the boxes of the involvement map (e.g., current status, attributes, failure conditions, operator override conditions, threshold evaluations, rule comparisons, operating conditions, etc.) and generate the notifications 1180 within each of the boxes of the involvement map 1122 based on the information for the respective building objects. The notifications 1180 can be provided within the boxes, adjacent to the boxes, or otherwise provided in connection with the boxes of the involvement map 1122 to convey various information about the respective building objects to the user within the user interface shown in FIG. 16.

Other System Architectures

While the present disclosure has been described in the context of implementing the involvement GUI 1100 using the BMS 100 and user interface system 202 architecture, it is contemplated that a variety of different types of system architectures may be implemented to provide the involvement GUI 1100. For example, the building data platform and the twin manager (i) described in (a) U.S. Patent Publication No. 2022/0405327, filed Jun. 22, 2021, and (b) International Patent Publication No. WO2021/138245, filed Dec. 28, 2020, both of which are incorporated herein by reference in their entireties, and (ii) described below with respect to FIGS. 17-21 may be used to implement and provide the involvement GUI 1100 via a digital twin of the building (e.g., the building subsystems 128) generated, managed, supported, and/or provided thereby. In some embodiments, objects 1114 of involvement GUI 1100 can be implemented as digital twins, nodes of an entity graph, smart entities, BRICK objects, or other types of entities that represent equipment, spaces, systems, data, persons, or any other type of entity in a building or building management system. The relationships between objects 1114 of involvement GUI 1100 can be implemented as connections or edges between nodes of an entity graph, relationships between smart entities, BRICK relationships, or any other type of relationship or connection that defines how one or more of objects 1114 relates to one or more other objects 1114. Various examples of potential architectures that can be used to represent, define, and store objects 1114 and the relationships between objects 1114 are described in detail herein with respect to FIGS. 17-21.

In some embodiments, the BMS 100 and/or the user interface system 202 generates the involvement GUI 1100 based on a digital twin of the BMS 100. For example, in response to receiving a selection of a first object (e.g., an object representing a particular piece of equipment, space, point, or other entity in the BMS 100), the user interface system 202 can query a digital twin of the BMS to identify an entity that corresponds to the first object (e.g., an entity that represents the same piece of equipment, space, point, etc. represented by the first object). The user interface system 202 can then identify any relationships (e.g., connections, edges, etc.) between the identified entity (i.e., the "first entity") and other entities in the digital twin of the BMS 100, as well as the other entities connected to the first entity. The user interface system 202 can extract the other entities and the relationships from the digital twin of the BMS 100 and use the extracted entities and relationships to populate the involvement GUI 1100. For example, the other entities connected to the first entity in the digital twin of the BMS 100 can be used to populate the second objects associated with the first object in the involvement GUI 1100. Similarly, the relationships connecting the first entity to the other entities in the digital twin of the BMS 100 can be used to populate the particular types of connections and connector lines in the involvement GUI 1100 between the first object and the second objects.

Using a digital twin of the BMS 100 to generate the involvement GUI 1100 provides several advantages over other types of graph data structures with entities and relationships. For example, the digital twin can be kept up-to-date by processing relationships and telemetry changes that happen within the building (e.g., in real-time, periodically, in response to detecting such changes, etc.). Accordingly, any changes to the relationships or objects in the BMS 100 can be automatically and rapidly reflected in the digital twin by making corresponding changes to the particular relationships and entities in the digital twin. Therefore, whenever the digital twin is queried to identify particular objects and connections associated with the first object in the involvement GUI 1100, the query result will be up-to-date and reflects the current state of the digital twin, which in turn reflects the current state of the BMS 100. The current state of the digital twin has an effect on the results of the involvement queries and relationships described herein, and therefore keeping the digital twin up-to-date ensures that the results of the involvement queries are up-to-date as well. These and other advantages provided by the digital twin are described in greater detail with reference to FIGS. 17-21.

Figure 17:
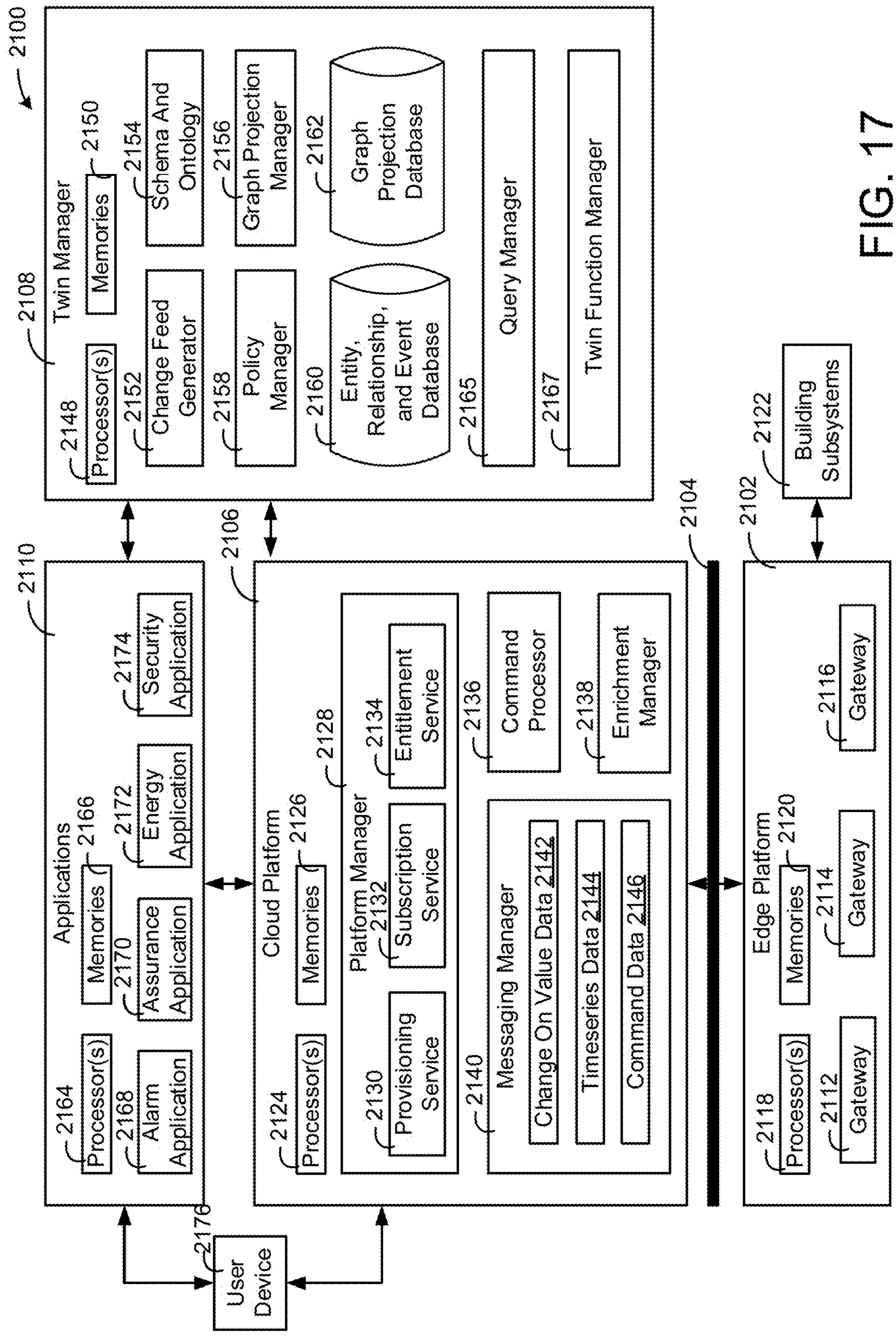
FIG. 17 is a block diagram of a building data platform including an edge platform, a cloud platform, and a twin manager, according to an exemplary embodiment.

Referring now to FIG. 17, a building data platform 2100 including an edge platform 2102, a cloud platform 2106, and a twin manager 2108 are shown, according to an exemplary embodiment. The edge platform 2102, the cloud platform 2106, and the twin manager 2108 can each be separate services deployed on the same or different computing systems. In some embodiments, the cloud platform 2106 and the twin manager 2108 are implemented in off premises computing systems, e.g., outside a building. The edge platform 2102 can be implemented on-premises, e.g., within the building. However, any combination of on-premises and off-premises components of the building data platform 2100 can be implemented.

The building data platform 2100 includes applications 2110. The applications 2110 can be various applications that operate to manage the building subsystems 2122. The applications 2110 can be remote or on-premises applications (or a hybrid of both) that run on various computing systems. The applications 2110 can include an alarm application 2168 configured to manage alarms for the building subsystems 2122. The applications 2110 include an assurance application 2170 that implements assurance services for the building subsystems 2122. In some embodiments, the applications 2110 include an energy application 2172 configured to manage the energy usage of the building subsystems 2122. The applications 2110 include a security application 2174 configured to manage security systems of the building.

In some embodiments, the applications 2110 and/or the cloud platform 2106 interacts with a user device 2176. In some embodiments, a component or an entire application of the applications 2110 runs on the user device 2176. The user device 2176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 2110, the twin manager 2108, the cloud platform 2106, and the edge platform 2102 can be implemented on one or more computing systems, e.g., on processors and/or memory devices. For example, the edge platform 2102 includes processor(s) 2118 and memories 2120, the cloud platform 2106 includes processor(s) 2124 and memories 2126, the applications 2110 include processor(s) 2164 and memories 2166, and the twin manager 2108 includes processor(s) 2148 and memories 2150.

The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 2102 can be configured to provide connection to the building subsystems 2122. The edge platform 2102 can receive messages from the building subsystems 2122 and/or deliver messages to the building subsystems 2122. The edge platform 2102 includes one or multiple gateways, e.g., the gateways 2112-2116. The gateways 2112-2116 can act as a gateway between the cloud platform 2106 and the building subsystems 2122. The gateways 2112-2116 can be the gateways described in U.S. Patent Publication No. 2021/0191826, filed Dec. 18, 2020, which is incorporated herein by reference in its entirety. In some embodiments, the applications 2110 can be deployed on the edge platform 2102. In this regard, lower latency in management of the building subsystems 2122 can be realized.

The edge platform 2102 can be connected to the cloud platform 2106 via a network 2104. The network 2104 can communicatively couple the devices and systems of building data platform 2100. In some embodiments, the network 2104 is at least one of and/or a combination of a WI-FI® network, a wired Ethernet network, a ZIGBEE® network, a BLUETOOTH® network, and/or any other wireless network. The network 2104 may be a local area network or a wide area network (e.g., the Internet, a building WAN, etc.) and may use a variety of communications protocols (e.g., BACnet, IP, LON, etc.). The network 2104 may include routers, modems, servers, cell towers, satellites, and/or network switches. The network 2104 may be a combination of wired and wireless networks.

The cloud platform 2106 can be configured to facilitate communication and routing of messages between the applications 2110, the twin manager 2108, the edge platform 2102, and/or any other system. The cloud platform 2106 can include a platform manager 2128, a messaging manager 2140, a command processor 2136, and an enrichment manager 2138. In some embodiments, the cloud platform 2106 can facilitate messaging between the building data platform 2100 via the network 2104.

The messaging manager 2140 can be configured to operate as a transport service that controls communication with the building subsystems 2122 and/or any other system, e.g., managing commands to devices (C2D), commands to connectors (C2C) for external systems, commands from the device to the cloud (D2C), and/or notifications. The messaging manager 2140 can receive different types of data from the applications 2110, the twin manager 2108, and/or the edge platform 2102. The messaging manager 2140 can receive change on value data 2142, e.g., data that indicates that a value of a point has changed. The messaging manager 2140 can receive timeseries data 2144, e.g., a time correlated series of data entries each associated with a particular time stamp. Furthermore, the messaging manager 2140 can receive command data 2146. All of the messages handled by the cloud platform 2106 can be handled as an event, e.g., the data 2142-2146 can each be packaged as an event with a data value occurring at a particular time (e.g., a temperature measurement made at a particular time).

The cloud platform 2106 includes a command processor 2136. The command processor 2136 can be configured to receive commands to perform an action from the applications 2110, the building subsystems 2122, the user device 2176, etc. The command processor 2136 can manage the commands, determine whether the commanding system is authorized to perform the particular commands, and communicate the commands to the commanded system, e.g., the building subsystems 2122 and/or the applications 2110. The commands could be a command to change an operational setting that control environmental conditions of a building, a command to run analytics, etc.

The cloud platform 2106 includes an enrichment manager 2138. The enrichment manager 2138 can be configured to enrich the events received by the messaging manager 2140. The enrichment manager 2138 can be configured to add contextual information to the events. The enrichment manager 2138 can communicate with the twin manager 2108 to retrieve the contextual information. In some embodiments, the contextual information is an indication of information related to the event. For example, if the event is a timeseries temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 2110 receives the event, the consuming application can operate based on the data of the event, the temperature measurement, and also the contextual information of the event.

The enrichment manager 2138 can solve a problem that when a device produces a significant amount of information, the information may contain simple data without context. An example might include the data generated when a user scans a badge at a badge scanner of the building subsystems 2122. This physical event can generate an output event including such information as "DeviceBadgeScannerID," "BadgeID," and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "DeviceBadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by 1/n, where n is the number of consumers of this data feed.

By using this enrichment, a system can also have the ability to filter out undesired events. If there are 100 building in a campus that receive 100,000 events per building each hour, but only 1 building is actually commissioned, only 1/10 of the events are enriched. By looking at what events are enriched and what events are not enriched, a system can do traffic shaping of forwarding of these events to reduce the cost of forwarding events that no consuming application wants or reads.

An example of an event received by the enrichment manager 2138 may be:

```
{
  "id": "someguid",
  "eventType": "Device_Heartbeat",
  "eventTime": "2018-01-27T00:00:00+00:00"
  "eventValue": 1,
  "deviceID": "someguid"
}
```

An example of an enriched event generated by the enrichment manager 2138 may be:

```
{
  "id": "someguid",
  "eventType": "Device_Heartbeat",
  "eventTime": "2018-01-27T00:00:00+00:00"
  "eventValue": 1,
  "deviceID": "someguid",
  "buildingName": "Building-48",
  "buildingID": "SomeGuid",
  "panelID": "SomeGuid",
  "panelName": "Building-48-Panel-13",
  "cityID": 371,
  "cityName": "Milwaukee",
  "stateID": 48,
  "stateName": "Wisconsin (WI)",
  "countryID": 1,
  "countryName": "United States"
}
```

By receiving enriched events, an application of the applications 2110 can be able to populate and/or filter what events are associated with what areas. Furthermore, user interface generating applications can generate user interfaces that include the contextual information based on the enriched events.

The cloud platform 2106 includes a platform manager 2128. The platform manager 2128 can be configured to manage the users and/or subscriptions of the cloud platform 2106. For example, what subscribing building, user, and/or tenant utilizes the cloud platform 106. The platform manager 2128 includes a provisioning service 2130 configured to provision the cloud platform 2106, the edge platform 2102, and the twin manager 2108. The platform manager 2128 includes a subscription service 2132 configured to manage a subscription of the building, user, and/or tenant while the entitlement service 2134 can track entitlements of the buildings, users, and/or tenants.

The twin manager 2108 can be configured to manage and maintain a digital twin. The digital twin can be a digital representation of the physical environment, e.g., a building. The twin manager 2108 can be configured to maintain the digital twin in an up-to-date state by processing relationships and telemetry changes that occur within the building (e.g., continuously, periodically, in real-time, etc.). The twin manager 2108 can include a change feed generator 2152, a schema and ontology 2154, a projection manager 2156, a policy manager 2158, an entity, relationship, and event database 2160, and a graph projection database 2162.

The graph projection manager 2156 can be configured to construct graph projections and store the graph projections in the graph projection database 2162 (e.g., by processing relationships and telemetry changes within the building). Entities, relationships, and events can be stored in the database 2160. The graph projection manager 2156 can retrieve entities, relationships, and/or events from the database 2160 and construct a graph projection based on the retrieved entities, relationships and/or events. In some embodiments, the database 2160 includes an entity-relationship collection for multiple subscriptions. Subscriptions can be subscriptions of a particular tenant.

In some embodiment, the graph projection manager 2156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 2156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 2156 and stored in the graph projection database 2162 can be a knowledge graph and is an integration point. For example, the graph projections can represent floor plans and systems associated with each floor. Furthermore, the graph projections can include events, e.g., telemetry data of the building subsystems 2122. The graph projections can show application services as nodes and API calls between the services as edges in the graph. The graph projections can illustrate the capabilities of spaces, users, and/or devices. The graph projections can include indications of the building subsystems 2122, e.g., thermostats, cameras, VAVs, etc. The graph projection database 2162 can store graph projections that keep up a current state of a building.

The graph projections of the graph projection database 2162 can be digital twins of a building. Digital twins can be digital replicas of physical entities that enable an in-depth analysis of data of the physical entities and provide the potential to monitor systems to mitigate risks, manage issues, and utilize simulations to test future solutions. Digital twins can play an important role in helping technicians find the root cause of issues and solve problems faster, in supporting safety and security protocols, and in supporting building managers in more efficient use of energy and other facilities resources. Digital twins can be used to enable and unify security systems, employee experience, facilities management, sustainability, etc.

In some embodiments the enrichment manager 2138 can use a graph projection of the graph projection database 2162 to enrich events. In some embodiments, the enrichment manager 2138 can identify nodes and relationships that are associated with, and are pertinent to, the device that generated the event. For example, the enrichment manager 2138 could identify a thermostat generating a temperature measurement event within the graph. The enrichment manager 2138 can identify relationships between the thermostat and spaces, e.g., a zone that the thermostat is located in. The enrichment manager 2138 can add an indication of the zone to the event.

Furthermore, the command processor 2136 can be configured to utilize the graph projections to command the building subsystems 2122. The command processor 2136 can identify a policy for a commanding entity within the graph projection to determine whether the commanding entity has the ability to make the command. For example, the command processor 2136, before allowing a user to make a command, determine, based on the graph projection database 2162, to determine that the user has a policy to be able to make the command.

In some embodiments, the policies can be conditional based policies. For example, the building data platform 2100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 2100 determines, based on the one or more conditional rules, that an action requested by a system does not match a normal behavior, the building data platform 2100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 2100 may contact an administrator to determine whether to give the user permission to log in.

The change feed generator 2152 can be configured to generate a feed of events that indicate changes to the digital twin, e.g., to the graph. The change feed generator 2152 can track changes to the entities, relationships, and/or events of the graph. For example, the change feed generator 2152 can detect an addition, deletion, and/or modification of a node or edge of the graph, e.g., changing the entities, relationships, and/or events within the database 2160. In response to detecting a change to the graph, the change feed generator 2152 can generate an event summarizing the change. The event can indicate what nodes and/or edges have changed and how the nodes and edges have changed. The events can be posted to a topic by the change feed generator 2152.

The change feed generator 2152 can implement a change feed of a knowledge graph. The building data platform 2100 can implement a subscription to changes in the knowledge graph. When the change feed generator 2152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodiments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 2108 may contain the history and the current state of the graph based upon schema evaluation, a consumer can retain a copy of that data, and thereby create dynamic views using the change feed.

The schema and ontology 2154 can define the message schema and graph ontology of the twin manager 2108. The message schema can define what format messages received by the messaging manager 2140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 2156 generates an graph projection for a user, system, or subscription, the graph projection manager 2156 can generate a graph projection according to the ontology specific to the user. For example, the ontology can define what types of entities are related in what order in a graph, for example, for the ontology for a subscription of "Customer A," the graph projection manager 2156 can create relationships for a graph projection based on the rule:

Region ←→ Building ←→ Floor ←→ Space ←→ Asset

For the ontology of a subscription of "Customer B," the graph projection manager 156 can create relationships based on the rule:

Building ←→ Floor ←→ Asset

The policy manager 2158 can be configured to respond to requests from other applications and/or systems for policies. The policy manager 2158 can consult a graph projection to determine what permissions different applications, users, and/or devices have. The graph projection can indicate various permissions that different types of entities have and the policy manager 2158 can search the graph projection to identify the permissions of a particular entity. The policy manager 2158 can facilitate fine grain access control with user permissions. The policy manager 2158 can apply permissions across a graph, e.g., if "user can view all data associated with floor 1" then they see all subsystem data for that floor, e.g., surveillance cameras, HVAC devices, fire detection and response devices, etc.

The twin manager 2108 includes a query manager 2165 and a twin function manager 2167. The query manger 2164 can be configured to handle queries received from a requesting system, e.g., the user device 2176, the applications 2110, and/or any other system. The query manager 2165 can receive queries that include query parameters and context. The query manager 2165 can query the graph projection database 2162 with the query parameters to retrieve a result. The query manager 2165 can then cause an event processor, e.g., a twin function, to operate based on the result and the context. In some embodiments, the query manager 2165 can select the twin function based on the context and/or perform operates based on the context.

The twin function manager 2167 can be configured to manage the execution of twin functions. The twin function manager 2167 can receive an indication of a context query that identifies a particular data element and/or pattern in the graph projection database 2162. Responsive to the particular data element and/or pattern occurring in the graph projection database 2162 (e.g., based on a new data event added to the graph projection database 2162 and/or change to nodes or edges of the graph projection database 2162, the twin function manager 2167 can cause a particular twin function to execute. The twin function can execute based on an event, context, and/or rules. The event can be data that the twin function executes against. The context can be information that provides a contextual description of the data, e.g., what device the event is associated with, what control point should be updated based on the event, etc.

Figure 18:
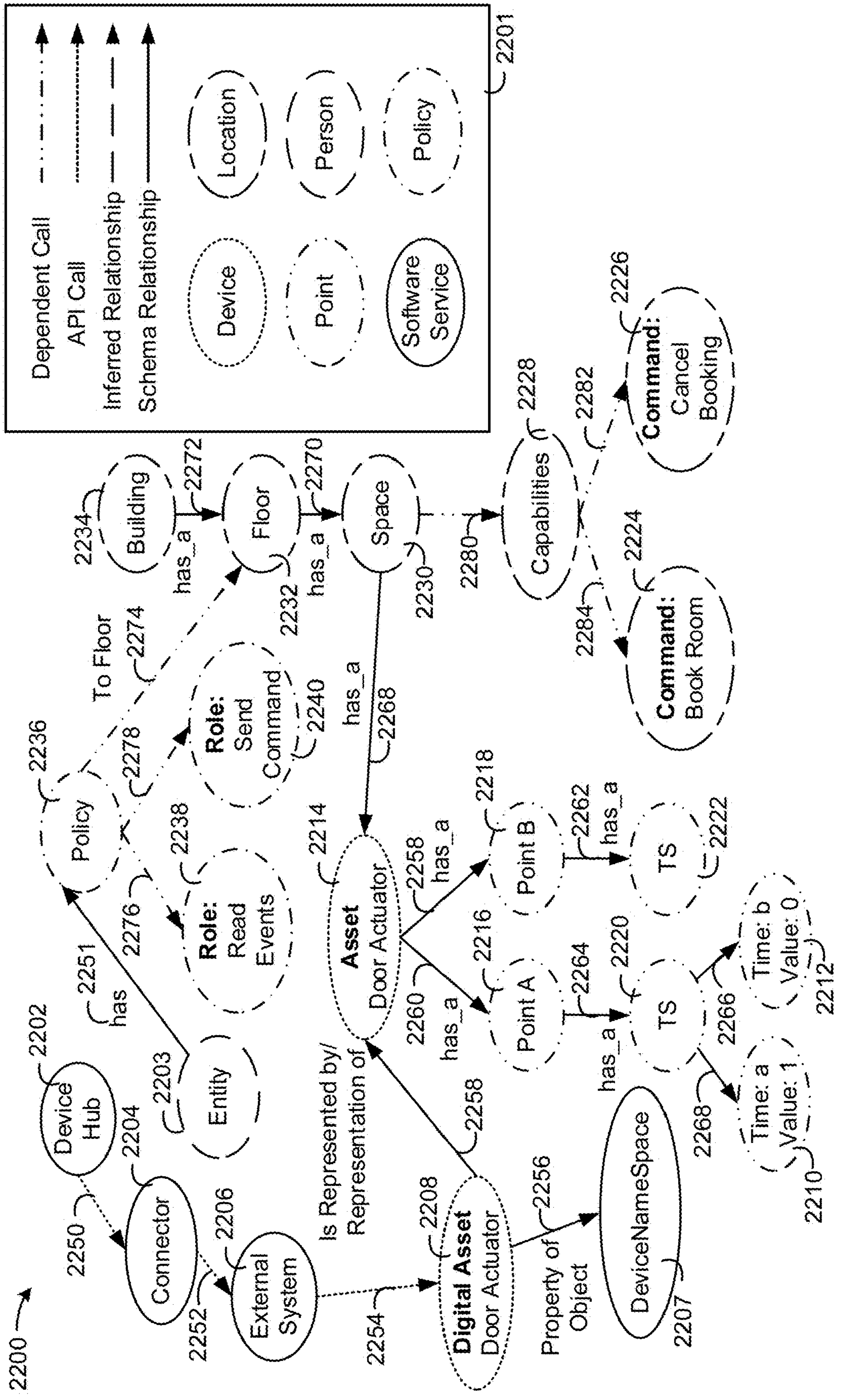
FIG. 18 is a graph projection of the twin manager of FIG. 17 including application programming interface (API) data, capability data, policy data, and services, according to an exemplary embodiment.

Referring now to FIG. 18, a graph projection 2200 of the twin manager 2108 including API data, capability data, policy data, and services is shown, according to an exemplary embodiment. The graph projection 2200 includes nodes 2202-2240 and edges 2250-2272. The nodes 2202-2240 and the edges 2250-2272 are defined according to the key 2201. The nodes 2202-2240 represent different types of entities, devices, locations, points, persons, policies, and software services (e.g., API services). The edges 2250-2272 represent relationships between the nodes 2202-2240, e.g., dependent calls, API calls, inferred relationships, and schema relationships (e.g., BRICK relationships).

The graph projection 2200 includes a device hub 2202 which may represent a software service that facilitates the communication of data and commands between the cloud platform 2106 and a device of the building subsystems 2122, e.g., door actuator 2214. The device hub 2202 is related to a connector 2204, an external system 2206, and a digital asset "Door Actuator" 2208 by edge 2250, edge 2252, and edge 2254.

The cloud platform 2106 can be configured to identify the device hub 2202, the connector 2204, the external system 2206 related to the door actuator 2214 by searching the graph projection 2200 and identifying the edges 22502-254 and edge 2258. The graph projection 2200 includes a digital representation of the "Door Actuator," node 2208. The digital asset "Door Actuator" 2208 includes a "DeviceNameSpace" represented by node 2207 and related to the digital asset "Door Actuator" 2208 by the "Property of Object" edge 2256.

The "Door Actuator" 2214 has points and timeseries. The "Door Actuator" 2214 is related to "Point A" 2216 by a "has_a" edge 2260. The "Door Actuator" 2214 is related to "Point B" 2218 by a "has_A" edge 2258. Furthermore, timeseries associated with the points A and B are represented by nodes "TS" 2220 and "TS" 2222. The timeseries are related to the points A and B by "has_a" edge 2264 and "has_a" edge 2262. The timeseries "TS" 2220 has particular samples, sample 2210 and 2212 each related to "TS" 2220 with edges 2268 and 2266, respectively. Each sample includes a time and a value. Each sample may be an event received from the door actuator that the cloud platform 2106 ingests into the entity, relationship, and event database 2160, e.g., ingests into the graph projection 2200.

The graph projection 2200 includes a building 2234 representing a physical building. The building includes a floor represented by floor 2232 related to the building 2234 by the "has_a" edge from the building 2234 to the floor 2232. The floor has a space indicated by the edge "has_a" 2270 between the floor 2232 and the space 2230. The space has particular capabilities, e.g., is a room that can be booked for a meeting, conference, private study time, etc. Furthermore, the booking can be canceled. The capabilities for the floor 2232 are represented by capabilities 2228 related to space 2230 by edge 2280. The capabilities 2228 are related to two different commands, command "book room" 2224 and command "cancel booking" 2226 related to capabilities 2228 by edge 2284 and edge 2282 respectively.

If the cloud platform 2106 receives a command to book the space represented by the node, space 2230, the cloud platform 2106 can search the graph projection 2200 for the capabilities 2228 related to the space 2230 to determine whether the cloud platform 2106 can book the room.

In some embodiments, the cloud platform 2106 could receive a request to book a room in a particular building, e.g., the building 2234. The cloud platform 2106 could search the graph projection 2200 to identify spaces that have the capabilities to be booked, e.g., identify the space 2230 based on the capabilities 2228 related to the space 2230. The cloud platform 2106 can reply to the request with an indication of the space and allow the requesting entity to book the space 2230.

The graph projection 2200 includes a policy 2236 for the floor 2232. The policy 2236 is related set for the floor 2232 based on a "To Floor" edge 2274 between the policy 2236 and the floor 2232. The policy 2236 is related to different roles for the floor 2232, read events 2238 via edge 2276 and send command 2240 via edge 2278. The policy 2236 is set for the entity 2203 based on has edge 2251 between the entity 2203 and the policy 2236.

The twin manager 2108 can identify policies for particular entities, e.g., users, software applications, systems, devices, etc. based on the policy 2236. For example, if the cloud platform 2106 receives a command to book the space 2230. The cloud platform 2106 can communicate with the twin manager 2108 to verify that the entity requesting to book the space 2230 has a policy to book the space. The twin manager 2108 can identify the entity requesting to book the space as the entity 2203 by searching the graph projection 2200. Furthermore, the twin manager 2108 can further identify the edge has 2251 between the entity 2203 and the policy 2236 and the edge 2278 between the policy 2236 and the command 2240.

Furthermore, the twin manager 2108 can identify that the entity 2203 has the ability to command the space 2230 based on the edge 2274 between the policy 2236 and the edge 2270 between the floor 2232 and the space 2230. In response to identifying the entity 2203 has the ability to book the space 2230, the twin manager 2108 can provide an indication to the cloud platform 2106.

Furthermore, if the entity makes a request to read events for the space 2230, e.g., the sample 2210 and the sample 2212, the twin manager 2108 can identify the edge has 2251 between the entity 2203 and the policy 2236, the edge 2278 between the policy 2236 and the read events 2238, the edge 2274 between the policy 2236 and the floor 2232, the "has_a" edge 2270 between the floor 2232 and the space 2230, the edge 2268 between the space 2230 and the door actuator 2214, the edge 2260 between the door actuator 2214 and the point A 2216, the "has_a" edge 2264 between the point A 2216 and the TS 2220, and the edges 2268 and 2266 between the TS 2220 and the samples 2210 and 2212 respectively.

Figure 19:
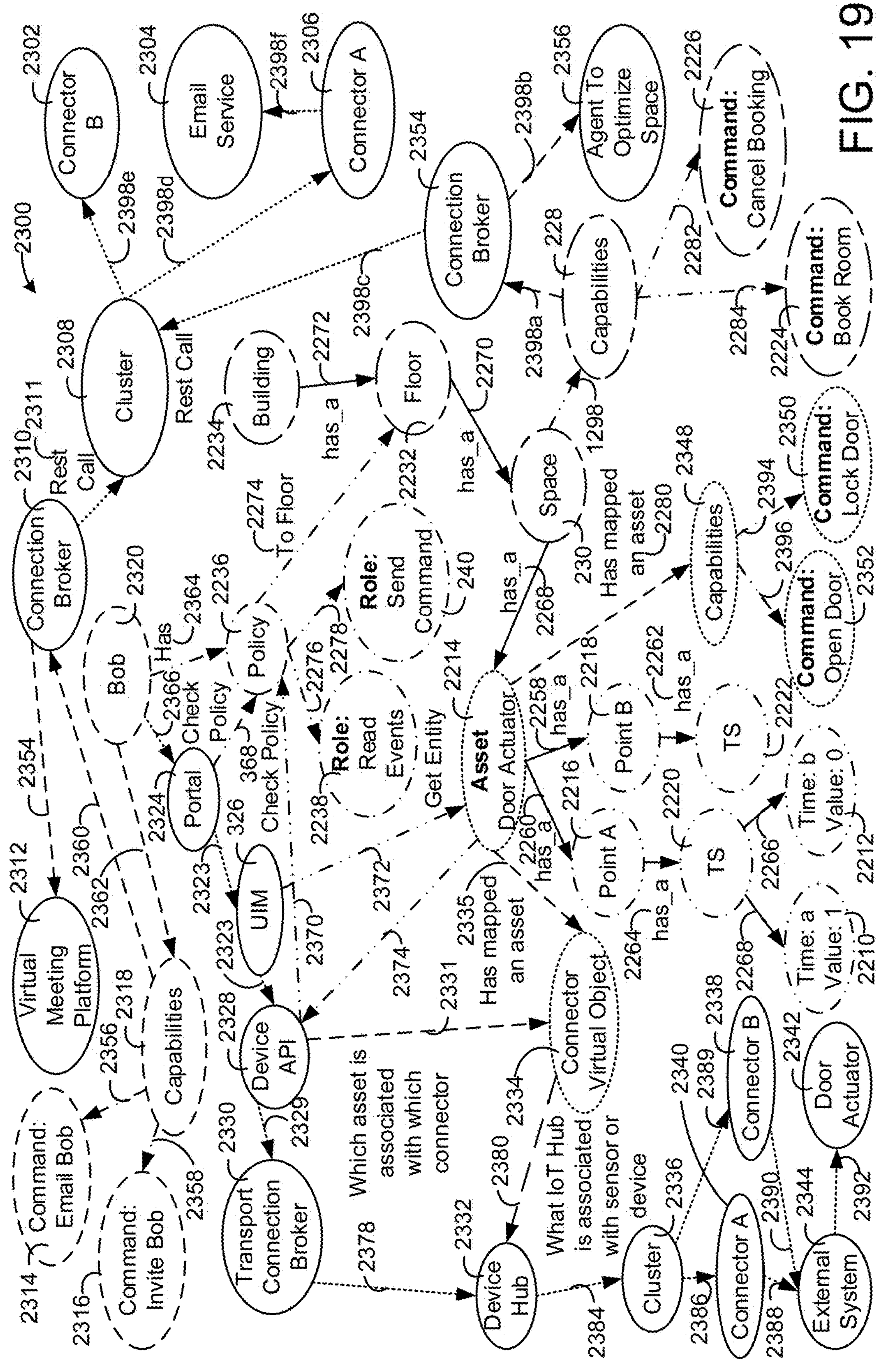
FIG. 19 is another graph projection of the twin manager of FIG. 17 including API data, capability data, policy data, and services, according to an exemplary embodiment.

Referring now to FIG. 19, a graph projection 2300 of the twin manager 2108 including API data, capability data, policy data, and services is shown, according to an exemplary embodiment. The graph projection 2300 includes the nodes and edges described in the graph projection 2200 of FIG. 18. The graph projection 2300 includes a connection broker 2354 related to capabilities 2228 by edge 2398*a*. The connection broker 2354 can be a node representing a software application configured to facilitate a connection with another software application. In some embodiments, the cloud platform 2106 can identify the system that implements the capabilities 2228 by identifying the edge 2398*a* between the capabilities 2228 and the connection broker 2354.

The connection broker 2354 is related to an agent that optimizes a space 2356 via edge 2398*b*. The agent represented by the node 2356 can book and cancel bookings for the space represented by the node 2230 based on the edge 2398*b* between the connection broker 2354 and the node 2356 and the edge 2398*a* between the capabilities 2228 and the connection broker 2354.

The connection broker 2354 is related to a cluster 2308 by edge 2398*c*. Cluster 2308 is related to connector B 2302 via edge 2398*e* and connector A 2306 via edge 2398*d*. The connector A 2306 is related to an external subscription service 2304. A connection broker 2310 is related to cluster 2308 via an edge 2311 representing a rest call that the connection broker represented by node 2310 can make to the cluster represented by cluster 2308.

The connection broker 2310 is related to a virtual meeting platform 2312 by an edge 2354. The node 2312 represents an external system that represents a virtual meeting platform. The connection broker represented by node 2310 can represent a software component that facilitates a connection between the cloud platform 2106 and the virtual meeting platform represented by node 2312. When the cloud platform 2106 needs to communicate with the virtual meeting platform represented by the node 2312, the cloud platform 2106 can identify the edge 2354 between the connection broker 2310 and the virtual meeting platform 2312 and select the connection broker represented by the node 2310 to facilitate communication with the virtual meeting platform represented by the node 2312.

A capabilities node 2318 can be connected to the connection broker 2310 via edge 2360. The capabilities 2318 can be capabilities of the virtual meeting platform represented by the node 2312 and can be related to the node 2312 through the edge 2360 to the connection broker 2310 and the edge 2354 between the connection broker 2310 and the node 2312. The capabilities 2318 can define capabilities of the virtual meeting platform represented by the node 2312. The node 2320 is related to capabilities 2318 via edge 2362. The capabilities may be an invite bob command represented by node 2316 and an email bob command represented by node 2314. The capabilities 2318 can be linked to a node 2320 representing a user, Bob. The cloud platform 2106 can facilitate email commands to send emails to the user Bob via the email service represented by the node 2304. The node 2304 is related to the connect a node 2306 via edge 2398*f*. Furthermore, the cloud platform 2106 can facilitate sending an invite for a virtual meeting via the virtual meeting platform represented by the node 2312 linked to the node 2318 via the edge 2358.

The node 2320 for the user Bob can be associated with the policy 2236 via the "has" edge 2364. Furthermore, the node 2320 can have a "check policy" edge 2366 with a portal node 2324. The device API node 2328 has a check policy edge 2370 to the policy node 2236. The portal node 2324 has an edge 2368 to the policy node 2236. The portal node 2324 has an edge 2323 to a node 2326 representing a user input manager (UIM). The portal node 2324 is related to the UIM node 2326 via an edge 2323. The UIM node 2326 has an edge 2323 to a device API node 2328. The UIM node 2326 is related to the door actuator node 2214 via edge 2372. The door actuator node 2214 has an edge 2374 to the device API node 2328. The door actuator 2214 has an edge 2335 to the connector virtual object 2334. The device hub 2332 is related to the connector virtual object via edge 2380. The device API node 2328 can be an API for the door actuator 2214. The connector virtual object 2334 is related to the device API node 2328 via the edge 2331.

The device API node 2328 is related to a transport connection broker 2330 via an edge 2329. The transport connection broker 2330 is related to a device hub 2332 via an edge 2378. The device hub represented by node 2332 can be a software component that hands the communication of data and commands for the door actuator 2214. The cloud platform 2106 can identify where to store data within the graph projection 2300 received from the door actuator by identifying the nodes and edges between the points 2216 and 2218 and the device hub node 2332. Similarly, the cloud platform 2308 can identify commands for the door actuator that can be facilitated by the device hub represented by the node 2332, e.g., by identifying edges between the device hub node 2332 and an open door node 2352 and an lock door node 2350. The door actuator 2214 has an edge "has mapped an asset" 2280 between the node 2214 and a capabilities node 2348. The capabilities node 2348 and the nodes 2352 and 2350 are linked by edges 2396 and 2394.

The device hub 2332 is linked to a cluster 2336 via an edge 2384. The cluster 2336 is linked to connector A 2340 and connector B 2338 by edges 2386 and the edge 2389. The connector A 2340 and the connector B 2338 is linked to an external system 2344 via edges 2388 and 2390. The external system 2344 is linked to a door actuator 2342 via an edge 2392.

Figure 20:
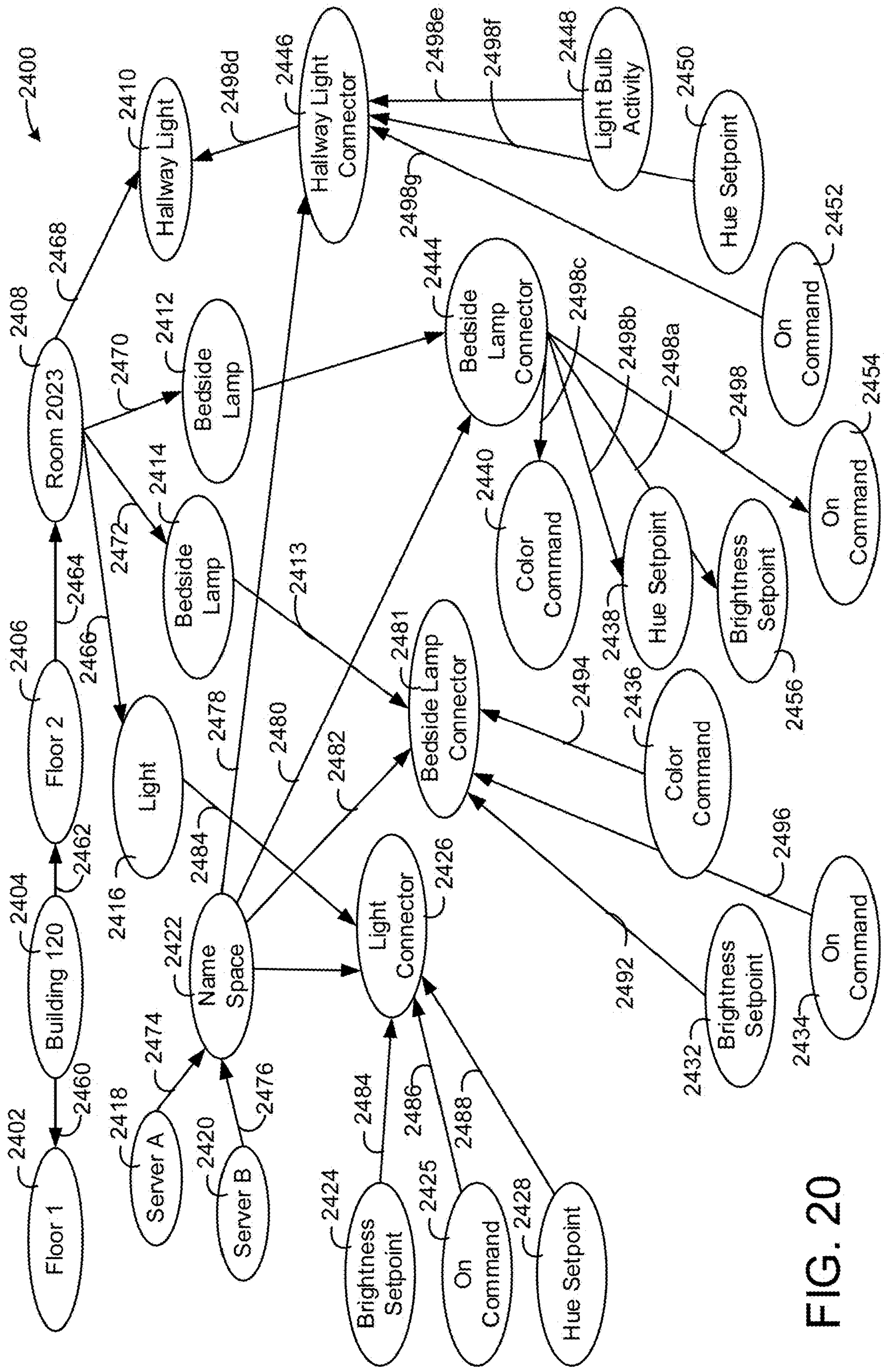
FIG. 20 is a graph projection of the twin manager of FIG. 17 including equipment and capability data for the equipment, according to an exemplary embodiment.

Referring now to FIG. 20, a graph projection 2400 of the twin manager 208 including equipment and capability data for the equipment is shown, according to an exemplary embodiment. The graph projection 2400 includes nodes 2402-2456 and edges **2360-498*f* The cloud platform 2106 can search the graph projection 2400** to identify capabilities of different pieces of equipment.

A building node 2404 represents a particular building that includes two floors. A floor 1 node 2402 is linked to the building node 2404 via edge 2460 while a floor 2 node 2406 is linked to the building node 2404 via edge 2462. The floor 2 includes a particular room 2023 represented by edge 2464 between floor 2 node 2406 and room 2023 node 2408. Various pieces of equipment are included within the room 2023. A light represented by light node 2416, a bedside lamp node 2414, a bedside lamp node 2412, and a hallway light node 2410 are related to room 2023 node 2408 via edge 2466, edge 2472, edge 2470, and edge 2468.

The light represented by light node 2416 is related to a light connector 2426 via edge 2484. The light connector 2426 is related to multiple commands for the light represented by the light node 4216 via edges 2484, 2486, and 2488. The commands may be a brightness setpoint 2424, an on command 2425, and a hue setpoint 2428. The cloud platform 2106 can receive a request to identify commands for the light represented by the light node 2416 and can identify the nodes 2424-2428 and provide an indication of the commands represented by the nodes 2424-2428 to the requesting entity. The requesting entity can then send commands for the commands represented by the nodes 2424-2428.

The bedside lamp node 2414 is linked to a bedside lamp connector 2481 via an edge 2413. The connector 2481 is related to commands for the bedside lamp represented by the bedside lamp node 2414 via edges 2492, 2496, and 2494. The command nodes are a brightness setpoint node 2432, an on command node 2434, and a color command 2436. The hallway light 2410 is related to a hallway light connector 2446 via an edge **2498*d*. The hallway light connector 2446 is linked to multiple commands for the hallway light node 2410 via edges 2498*g*, 2498*f*, and 2498*e*. The commands are represented by an on command node 2452, a hue setpoint node 2450, and a light bulb activity node 2448**.

The graph projection 2400 includes a name space node 2422 related to a server A node 2418 and a server B node 2420 via edges 2474 and 2476. The name space node 2422 is related to the bedside lamp connector 2481, the bedside lamp connector 2444, and the hallway light connector 2446 via edges 2482, 2480, and 2478. The bedside lamp connector 2444 is related to commands, e.g., the color command node 2440, the hue setpoint command 2438, a brightness setpoint command 2456, and an on command 2454 via edges **2498*c*, 2498*b*, 2498*a*, and 2498**.

Figure 21:
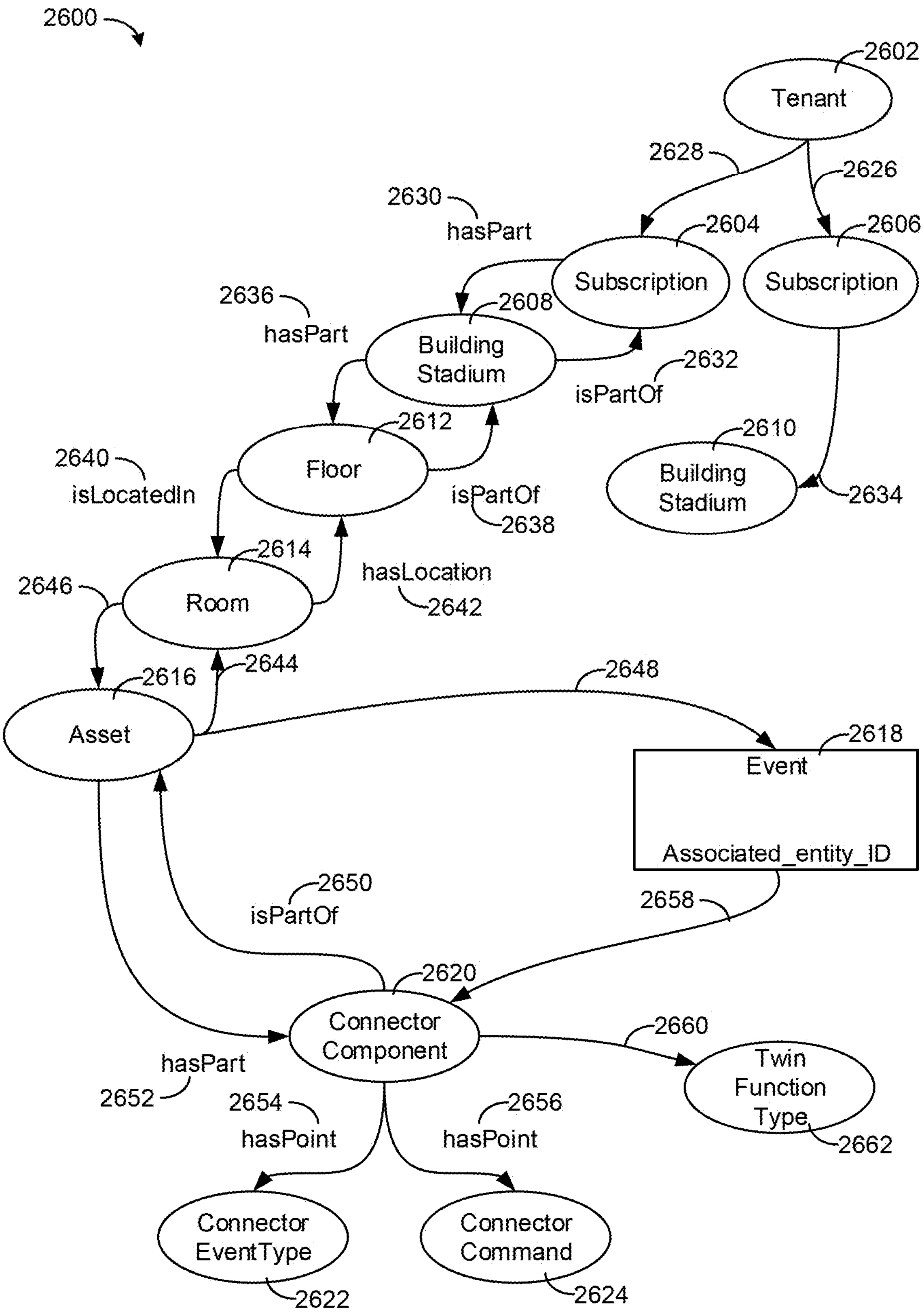
FIG. 21 is a graph including nodes and edges where one node represents an event associated with a twin function type, according to an exemplary embodiment.

Referring now to FIG. 21, a graph 2600 including nodes and edges where one node, event 2618, represents an event associated with a twin function type is shown, according to an exemplary embodiment. The nodes 2602-2624 and node 2662 of the graph 2600 are interconnected by the edges 2626-2658 and edge 2660. In some embodiments, the twin function manager 2167 can operate against the graph 2600 to spin up twin functions, e.g., responsive to receiving a specific event and/or a state of an asset, space, person, device, etc. changing.

In the graph 2600 includes a tenant 2602. The tenant 2602 may represent an entity (e.g., user, company, etc.) that has a contract or agreement to use processing resources of the system 2100. The tenant 2602 includes two subscriptions, subscription 2604 and subscription 2606. The tenant 2602 is related to the subscription 2604 via edge 2628. The tenant 2602 is related to the subscription 2606 via the edge 2626. The tenant 2602 may be the owner of various stadiums, e.g., two stadiums. The subscription 2604 may be for a building stadium 2608. The subscription 2604 is related to the building stadium 2608 via the "hasPart" edge 2630. The building stadium 2608 is related to the subscription 2604 via the edge "isPartOf" 2632. The subscription 2606 can be for another building stadium, building stadium 2610. The subscription 2606 is related to the building stadium 2610 via an edge 2634.

The building stadium 2608 is related to the floor 2612. The building stadium 2608 is related to the floor 2612 via the "hasPart" edge 2636. The floor 2612 is related to the building stadium 2608 via the "isPartOf" edge 2638. The floor 2612 is related to the room 2614 via an "isLocatedIn" edge 2640. The room 2614 is related to the floor 2612 via the "hasLocation" edge 2642. The room 2614 is related to an asset 2616 via an edge 2646 while the asset 2616 is related to the room 2614 via an edge 2644.

The asset 2616 includes an event, the event 2618. The asset 2616 is related to the event 2618 via the edge 2648. The asset 2616 is related to the connector component 2620 via a "hasPart" edge 2652. The connector component 2620 is related to the asset 2616 via an "isPartOf" edge 2650. The connector component 2620 is related to the connector eventType 2622 via a "hasPoint" edge 2654 and is related to the connector command 2624 via a "hasPoint" edge 2656.

In some embodiments, responsive to the event 2618 being received and added to the building graph 2600, a twin function of a specific type can run and execute based at least in part on the event 2618. In some embodiments, the connector component 2620 can represent a stream of events where the event 2618 is one event of the stream. The twin manager 2108 can generate the connector component 2620 to represent the event stream, e.g., telemetry of the asset 2616. Additional events can be added to the building graph 2600 of the event stream and related via an edge to the connector component 2620. The event stream can be a virtual event stream generated based on other events. The connector component 2620 can represent a derived point for the virtual event stream. The event 2618 can include an identifier, "Associated_entity_ID" which may identify the asset, e.g., asset 2616, that the event 2618 is associated with.

The connector 2620 is related to a twin function type 2662 via an edge 2660. The twin function type 2662 can indicate a specific type of twin function that should execute based on the reception of the event 2618 and/or an event of the event stream with a particular event value. Furthermore, in some embodiments, the event 2618 can be an event generated by a twin function of the twin function of the twin function type 2662. The event 2618 can be added to the graph 2600 based on the twin function type 2662.

In some embodiments, the event 2618 represents a state of the asset 2616. Responsive to receiving the event 2618, a state of the asset 2616 can change, e.g., by the presence of the event 2618 in the graph 2600. In some embodiments, as a new event is received, the new event can be added to the building graph 2600 to replace the existing event 2618. In some embodiments, a twin function can execute responsive to a certain state of an asset changing in a particular manner.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A building system for a building having one or more building subsystems, the building system comprising:

one or more memory devices having instructions stored thereon that, when executed by one or more processors, cause the one or more processors to:

acquire a selection of a first object, the first object representing a component of the one or more building subsystems;

acquire information regarding one or more second objects associated with the first object, the information including an involvement type for a relationship between the first object and each of the one or more second objects, wherein the involvement type indicates whether the relationship between the first object represented by a first indicia and a respective second object of the one or more second objects represented by a respective one of one or more second indicia is a referential involvement, a command involvement, or an unbound involvement, wherein the unbound involvement indicates an unbound relationship where the relationship between the first object and the respective second object previously existed but no longer exists;

generate an involvement map for display via a graphical user interface, the involvement map including the first indicia representing the first object and the one or more second indicia representing each of the one or more second objects, the first indicia and each of the one or more second indicia connected via a connector line, the connector line including the involvement type disposed therealong; and operate the component of the one or more building subsystems represented by the first object to affect an operation or condition of building equipment or a building space associated with the one or more second objects in response to determining that the relationship between the first object and the one or more second objects indicated by the involvement type indicates that the component of the one or more building subsystems represented by the first object is operable to affect the operation or the condition of the building equipment or the building space associated with the one or more second objects.

2. The building system of claim 1, wherein at least one memory device of the one or more memory devices is a memory device of a twin manager configured to provide a digital twin for the one or more building subsystems.

3. The building system of claim 2, wherein the digital twin is a digital representation of a physical environment including the building and the one or more building subsystems, and wherein the twin manager is configured to maintain the digital twin in an up-to-date state by processing relationships and telemetry changes that occur within the building.

4. The building system of claim 3, wherein the digital representation includes a graph projection that provides relationships between the building and the one or more building subsystems, and wherein the information regarding the one or more second objects associated with the first object is acquired from the graph projection.

5. The building system of claim 1, wherein the referential involvement indicates that at least one of (a) the first object references the respective second object or (b) the first object is referenced by the respective second object.

6. The building system of claim 1, wherein the command involvement indicates that at least one of (a) the first object controls the respective second object or (b) the first object is controlled by the respective second object.

7. The building system of claim 6, wherein the command involvement includes a first type and a second type, the first type being a write-control relationship, the second type being a command-control relationship.

8. The building system of claim 7, wherein a respective type of the command involvement is displayed on the graphical user interface by hovering over or selecting the involvement type along the connector line.

9. The building system of claim 1, wherein the unbound involvement facilitates detecting the unbound relationship and either reinstituting the relationship or permanently deleting the relationship.

10. The building system of claim 1, wherein the one or more memory devices have instructions stored thereon that, when executed by the one or more processors, cause the one or more processors to:

display data regarding a respective one of the one or more second objects within a respective one of the one or more second indicia associated therewith; and dynamically update the data in real-time.

11. The building system of claim 1, wherein the one or more memory devices have instructions stored thereon that, when executed by the one or more processors, cause the one or more processors to provide a notification within a respective one of the one or more second indicia.

12. The building system of claim 11, wherein the notification includes two bars extending along opposing ends or sides of the respective one of the one or more second indicia.

13. The building system of claim 11, wherein the one or more memory devices have instructions stored thereon that, when executed by the one or more processors, cause the one or more processors to vary an appearance of the notification based on a type of the notification.

14. The building system of claim 1, wherein:

the one or more memory devices have instructions stored thereon that, when executed by the one or more processors, cause the one or more processors to acquire the information regarding the one or more second objects and one or more third objects associated with the first object, the information including the involvement type for the relationship between (a) the first object and each of the one or more second objects and (b) the first object and each of the one or more third objects;

the involvement map includes (a) the first indicia representing the first object, (b) the one or more second indicia representing each of the one or more second objects, and (c) one or more third indicia representing each of the one or more third objects;

(a) one or more first connector lines connect the first indicia and each of the one or more second indicia and (b) one or more second connector lines connect the first indicia and each of the one or more third indicia;

the one or more second objects have one of an upstream involvement or a downstream involvement with the first object; and the one or more third objects have the other of the upstream involvement or the downstream involvement with the first object.

15. A method for providing a graphical user interface that displays involvement between components of one or more building subsystems, the method comprising:

acquiring, by one or more processing circuits, a selection of a first object, the first object representing a component of the one or more building subsystems;

acquiring, by the one or more processing circuits, information regarding one or more second objects associated with the first object, the information including an involvement type for a relationship between the first object and each of the one or more second objects;

generating, by the one or more processing circuits, an involvement map for display via the graphical user interface, the involvement map including a first indicia representing the first object and one or more second indicia representing each of the one or more second objects, the first indicia and each of the one or more second indicia connected via a respective connector line, the respective connector line including the involvement type disposed therealong, wherein the involvement type indicates whether the relationship between the first object represented by the first indicia and a respective second object of the one or more second objects represented by a respective one of the one or more second indicia is a referential involvement, a command involvement, or an unbound involvement, wherein the unbound involvement indicates an unbound relationship where the relationship between the first object and the respective second object previously existed but no longer exists; and operate the component of the one or more building subsystems represented by the first object to affect an operation or condition of building equipment or a building space associated with the one or more second objects in response to determining that the relationship between the first object and the one or more second objects indicated by the involvement type indicates that the component of the one or more building subsystems represented by the first object is operable to affect the operation or the condition of the building equipment or the building space associated with the one or more second objects.

16. The method of claim 15, wherein the referential involvement indicates that at least one of (a) the first object references the respective second object or (b) the first object is referenced by the respective second object, wherein the command involvement indicates that at least one of (a) the first object controls the respective second object or (b) the first object is controlled by the respective second object, and wherein the command involvement includes a first type and a second type, the first type being a write-control relationship, the second type being a command-control relationship.

17. The method of claim 15, further comprising acquiring, by the one or more processing circuits, the information regarding the one or more second objects and one or more third objects associated with the first object, the information including the involvement type for the relationship between (a) the first object and each of the one or more second objects and (b) the first object and each of the one or more third objects, wherein:

the involvement map includes (a) the first indicia representing the first object, (b) the one or more second indicia representing each of the one or more second objects, and (c) one or more third indicia representing each of the one or more third objects;

(a) the first indicia and each of the one or more second indicia and (b) the first indicia and each of the one or more third indicia are connected via respective connector line;

the one or more second objects have one of an upstream involvement or a downstream involvement with the first object; and the one or more third objects have the other of the upstream involvement or the downstream involvement with the first object.

18. A building system for a building having one or more building subsystems, the building system comprising:

one or more memory devices having instructions stored thereon that, when executed by one or more processors, cause the one or more processors to:

acquire a selection of a first object, the first object representing a component of the one or more building subsystems;

acquire information regarding one or more second objects and one or more third objects associated with the first object, the information including an involvement type for a relationship between (a) the first object and each of the one or more second objects and (b) the first object and each of the one or more third objects, wherein the one or more second objects have an upstream involvement with the first object, and wherein the one or more third objects have a downstream involvement with the first object;

generate an involvement map for display via a graphical user interface, the involvement map including a first indicia representing the first object, one or more second indicia representing each of the one or more second objects, and one or more third indicia representing each of the one or more third objects, (a) the first indicia and each of the one or more second indicia and (b) the first indicia and each of the one or more third indicia are connected via a respective connector line, the respective connector line including the involvement type disposed therealong, the involvement type indicating whether the relationship between (a) the first object represented by the first indicia and (b) a respective second object of the one or more second objects represented by a respective one of the one or more second indicia or a respective third object of the one or more third objects represented by a respective one of the one or more third indicia is a referential involvement, a command involvement, or an unbound involvement, wherein the unbound involvement indicates an unbound relationship where the relationship between the first object and the respective second object previously existed but no longer exists; and operate the component of the one or more building subsystems represented by the first object to affect an operation or condition of building equipment or a building space associated with the one or more second objects in response to determining that the relationship between the first object and the one or more second objects indicated by the involvement type indicates that the component of the one or more building subsystems represented by the first object is operable to affect the operation or the condition of the building equipment or the building space associated with the one or more second objects.

* * * * *